US011974639B2

(12) United States Patent
Sepe et al.

(10) Patent No.: US 11,974,639 B2
(45) Date of Patent: May 7, 2024

(54) HARNESS CONNECTION ARRANGEMENT

(71) Applicant: MSA Technology, LLC, Cranberry Township, PA (US)

(72) Inventors: Benjamin T. Sepe, Pittsburgh, PA (US); Matthew Frederick Jacob, Pittsburgh, PA (US); Matthew Quigley, Pittsburgh, PA (US)

(73) Assignee: MSA Technology, LLC, Cranberry Township, PA (US)

( * ) Notice: Subject to any disclaimer, the term of this patent is extended or adjusted under 35 U.S.C. 154(b) by 956 days.

(21) Appl. No.: 16/453,363

(22) Filed: Jun. 26, 2019

(65) Prior Publication Data

US 2020/0008537 A1 Jan. 9, 2020

Related U.S. Application Data

(60) Provisional application No. 62/695,398, filed on Jul. 9, 2018.

(51) Int. Cl.
*A44B 11/25* (2006.01)
*A62B 35/00* (2006.01)
*A62B 35/04* (2006.01)

(52) U.S. Cl.
CPC ...... *A44B 11/2553* (2013.01); *A44B 11/2526* (2013.01); *A62B 35/0018* (2013.01); *A62B 35/04* (2013.01)

(58) Field of Classification Search
CPC ............. Y10T 24/4028; Y10T 24/4002; Y10T 24/4035; Y10T 24/4086; Y10T 24/4084;
(Continued)

(56) References Cited

U.S. PATENT DOCUMENTS 2,108,716 A * 2/1938 Ove ........................ B64D 17/30 24/579.11
2,531,442 A * 11/1950 Junker .................... F16B 45/02 24/321
(Continued)

FOREIGN PATENT DOCUMENTS

CA 2504473 A1 10/2005
CA 2573356 A1 2/2006
(Continued)

*Primary Examiner* — Robert Sandy
*Assistant Examiner* — Michael S Lee
(74) *Attorney, Agent, or Firm* — Jones Day

(57) ABSTRACT

A connection arrangement for use with a wearable body harness has a first connector with a first fixed buckle configured to connect to a first portion of a first shoulder strap of the harness, and a first adjustable buckle configured to connect to a second portion of the first shoulder strap. The connection arrangement further has a second connector removably connectable to the first connector. The second connector has a second fixed buckle configured to connect to a first portion of a second shoulder strap of the harness, and a second adjustable buckle configured to connect to a second portion of the second shoulder strap. Each of the first adjustable buckle and the second adjustable buckle has an adjustment mechanism configured for adjusting a length of the second portion of the first and second shoulder straps by selective frictional engagement with the second portion of the first and second shoulder straps.

22 Claims, 7 Drawing Sheets

(58) Field of Classification Search
CPC ............. Y10T 24/4047; A44B 11/2553; A44B 11/2526; A62B 35/0018
See application file for complete search history.

(56) References Cited

U.S. PATENT DOCUMENTS

| | | | | |
|---|---|---|---|---|
| 4,713,864 | A | 12/1987 | Hess | |
| 5,033,171 | A * | 7/1991 | Kasai | A44B 11/266 24/648 |
| 6,041,444 | A | 3/2000 | McKinney | |
| 6,283,350 | B1 * | 9/2001 | Gottmeier | A45F 3/04 224/638 |
| 6,457,774 | B2 | 10/2002 | Baloga | |
| 6,871,766 | B2 | 3/2005 | Nordstrom | |
| 6,926,183 | B2 * | 8/2005 | Chang | A45F 3/14 224/264 |
| 6,971,476 | B2 | 12/2005 | Wolner et al. | |
| 7,036,157 | B1 | 5/2006 | Andersson et al. | |
| 7,073,627 | B2 | 7/2006 | Casebolt et al. | |
| 7,144,086 | B1 | 12/2006 | Harcourt et al. | |
| 7,178,632 | B2 | 2/2007 | Casebolt et al. | |
| 7,252,342 | B2 | 8/2007 | Patrizi et al. | |
| D595,183 | S | 6/2009 | Nelson et al. | |
| 7,712,196 | B2 * | 5/2010 | Kawamura | A44B 11/2511 24/579.11 |
| 8,328,289 | B2 | 12/2012 | Tharp | |
| 8,408,656 | B2 | 4/2013 | Carpenter | |
| 8,418,898 | B2 | 4/2013 | Carlsson et al. | |
| 8,776,324 | B2 | 7/2014 | Steck et al. | |
| 8,974,005 | B2 | 3/2015 | Mason et al. | |
| 9,067,561 | B2 | 6/2015 | Crews | |
| 9,174,071 | B2 | 11/2015 | Seman et al. | |
| 9,192,145 | B2 | 11/2015 | Kissel, Jr. | |
| 9,254,816 | B2 | 2/2016 | You | |
| 9,399,417 | B1 | 7/2016 | Grey et al. | |
| 9,457,208 | B2 | 10/2016 | Seman et al. | |
| 9,560,898 | B2 * | 2/2017 | Hortnagl | A44B 11/2553 |
| 9,713,968 | B1 | 7/2017 | Richardson et al. | |
| 10,035,029 | B2 | 7/2018 | Dawson | |
| 10,850,142 | B2 | 12/2020 | Emonin | |
| 2002/0088836 | A1 * | 7/2002 | Batten | A45F 3/047 224/645 |
| 2005/0121568 | A1 | 6/2005 | Youngberg | |
| 2005/0145658 | A1 * | 7/2005 | Yang | A45F 3/12 224/260 |
| 2005/0260920 | A1 * | 11/2005 | Cheng | A41C 3/02 450/58 |
| 2006/0102423 | A1 | 5/2006 | Lang et al. | |
| 2006/0005293 | A1 | 6/2006 | Frey et al. | |
| 2007/0062760 | A1 | 3/2007 | Wolner | |
| 2010/0025148 | A1 | 2/2010 | Dawson | |
| 2010/0244543 | A1 | 9/2010 | Fine et al. | |
| 2011/0113520 | A1 | 5/2011 | Dennis | |
| 2012/0019043 | A1 | 1/2012 | Merrill et al. | |
| 2013/0291344 | A1 * | 11/2013 | Hortnagl | A44B 11/10 24/196 |
| 2015/0191147 | A1 | 7/2015 | Cobb | |
| 2016/0059053 | A1 | 3/2016 | Seman et al. | |
| 2017/0049218 | A1 | 2/2017 | Moncreiff | |
| 2017/0120087 | A1 | 5/2017 | Cowell et al. | |
| 2017/0291046 | A1 | 10/2017 | Bouquier | |
| 2019/0070442 | A1 | 3/2019 | Jacob | |
| 2019/0070443 | A1 | 3/2019 | Hetrich et al. | |
| 2020/0114180 | A1 * | 4/2020 | Monahan | A62B 35/0025 |
| 2020/0114181 | A1 * | 4/2020 | Monahan | A62B 35/0025 |
| 2020/0406072 | A1 * | 12/2020 | Monahan | A44B 11/2546 |

FOREIGN PATENT DOCUMENTS

| | | | |
|---|---|---|---|
| CA | 2488288 | A1 | 5/2006 |
| CA | 2672244 | A1 | 6/2007 |
| CA | 2387758 | C | 2/2010 |
| CA | 2535824 | C | 6/2010 |
| CA | 2792321 | A1 | 4/2013 |
| CN | 102711544 | A | 10/2012 |
| CN | 108114386 | A | 6/2018 |
| DE | 9400218 | U1 | 2/1994 |
| DE | 102013222372 | A1 | 5/2015 |
| EP | 1162107 | A2 | 12/2001 |
| EP | 1222004 | B1 | 12/2005 |
| EP | 1200028 | B1 | 10/2006 |
| EP | 1768752 | A1 | 4/2007 |
| EP | 1660191 | B1 | 5/2011 |
| EP | 2724752 | A2 | 4/2014 |
| EP | 2789252 | A1 | 10/2014 |
| EP | 1660192 | B1 | 11/2015 |
| EP | 3017847 | A1 | 5/2016 |
| EP | 3162411 | A1 | 5/2017 |
| EP | 2892766 | B1 | 10/2017 |
| FR | 2945221 | A1 | 11/2010 |
| WO | 2006017350 | A1 | 2/2006 |
| WO | 2012063064 | A2 | 5/2012 |
| WO | 2015166224 | A1 | 5/2015 |
| WO | 2016175663 | A1 | 11/2016 |

* cited by examiner

HARNESS CONNECTION ARRANGEMENT

CROSS-REFERENCE TO RELATED APPLICATIONS

This application claims priority to U.S. Provisional Application No. 62/695,398, filed on Jul. 9, 2018, the disclosure of which is hereby incorporated by reference in its entirety.

BACKGROUND OF THE DISCLOSURE

Field of the Disclosure

The present disclosure relates generally to wearable body harnesses and, in particular, to a harness connection arrangement for use with wearable body harnesses.

Description of the Related Art

As is known in the art, there exist various safety devices and arrangements that can be worn by or attached to a user to ensure the wearer's safety in certain situations. Such mechanisms come in many forms, including, but not limited to, harnesses and safety belts. Full body harnesses are widely used for lifting and lowering individuals in dangerous situations and as a primary component in a personal fall arrest system. These harnesses can also be used for work positioning, travel restriction, ladder climbing, rescue retrieval, and evacuation. While these harnesses are used mainly in an industrial setting, and particularly the construction industry where the likelihood and danger of falls from heights is both numerous and significant, a full body harness can be used in various other applications in which total suspension and support of the body must be ensured, either expectedly or unexpectedly.

While there are many variations in full body harness construction, all typically include a plurality of elongated straps that are combined together to fit around a user's body. In some embodiments or aspects, a full body harness may have an attachment point (D-ring) typically positioned in a central portion of the user's back or chest, and a plurality of straps routed around predetermined portions of the user's body in such a manner as to hold or suspend the user in the event of a fall. One or more straps of the harness may be removably connected together by a connector, such as a buckle.

While a variety of connectors exist in the art for connecting the straps of the harness, there is a continued need in the art for improved connectors. For example, there is a need for improved connectors that prevent tangling of harness straps. There is a further need in the art for improved connectors that can be easily and effectively connected and disconnected to allow quick donning and removal of the harness. There is also a need for improved connectors with increased safety compliance and redundant safety mechanisms.

SUMMARY OF THE DISCLOSURE

Generally, provided is an improved body harness having an improved harness connection arrangement. Preferably, provided is an improved harness having a harness connection arrangement that can be easily and effectively worn by the user in a variety of work environments without compromising the user's ability to move. Preferably, provided is a harness having a connector for connecting at least two straps of the harness, wherein the connector can be easily and effectively connected and disconnected to allow quick donning and removal of the harness. Preferably, provided is an improved harness having a harness connection arrangement that not only leads to increased safety compliance at the worksite, but also provides increased effectiveness and safety to the user.

In some non-limiting embodiments or aspects, a connection arrangement for use with a wearable body harness may have a first connector with a first fixed buckle configured to connect to a first portion of a first shoulder strap of the wearable body harness, and a first adjustable buckle configured to connect to a second portion of the first shoulder strap. The connection arrangement may further have a second connector removably connectable to the first connector. The second connector may have a second fixed buckle configured to connect to a first portion of a second shoulder strap of the wearable body harness, and a second adjustable buckle configured to connect to a second portion of the second shoulder strap. Each of the first adjustable buckle and the second adjustable buckle may have an adjustment mechanism configured for adjusting a length of the second portion of the first and second shoulder straps by selective frictional engagement with the second portion of the first and second shoulder straps.

In some non-limiting embodiments or aspects, the adjustment mechanism may have a frame having terminal ends connected to a body of each of the first connector and the second connector with an opening defined between a central portion of the frame and the body of the first connector and the second connector. The adjustment mechanism may further have an adjustment bar extending across the opening and movably engaged with the terminal ends of the frame. The adjustment bar may have an elongated body movably engaged with the terminal ends of the frame. The elongated body may be positioned within a slot of the frame. Each of the first fixed buckle and the second fixed buckle may have a bar spaced apart from a body of the first connector and the second connector by a gap. The bar of each the first fixed buckle and the second fixed buckle may be connected to the body of the first connector and the second connector by a pair of posts.

In some non-limiting embodiments or aspects, the first connector and the second connector may be removably connectable to each other via a locking and release mechanism between a first, locked configuration, where the first connector and the second connector are connected to each other, and a second, unlocked configuration, where the first connector and the second connector are disconnected from each other. The first connector may have a first portion of a locking and release mechanism, and the second connector may have a second portion of the locking and release mechanism. The first portion of the locking and release mechanism may have a tab having a first end connected to the body of the first connector and a second, free end protruding away from the body of the first connector, and a first latch at the second end of the tab and protruding laterally outward relative to at least one lateral side of the tab. The second portion of the locking and release mechanism may have an upper plate and a lower plate defining a slot therebetween and configured for receiving at least a portion of the tab, and a pair of locking arms disposed within at least a portion of the slot and configured for interacting with the tab. The pair of locking arms may be movable between a first, locked position and a second, unlocked position to allow movement of at least a portion of the tab into and out of the slot. Each of the pair of locking arms may have a locking tooth at a first end and a release tab at a second end with a pivot pin positioned between the locking tooth and the release tab such that each locking arm is pivotally movable about the pivot pin. Each of the pair of locking arms may be biased to the first position by a biasing member.

In some non-limiting embodiments or aspects, a wearable body harness having a plurality of straps may have a first shoulder strap and a second shoulder strap, a first connector on the first shoulder strap, and a second connector on the second shoulder strap. The first shoulder strap and the second shoulder strap may be removably connectable to each other with engagement of the first connector and the second connector. The first connector may have a first fixed buckle configured to connect to a first portion of the first shoulder strap, and a first adjustable buckle configured to connect to a second portion of the first shoulder strap. The second connector may have a second fixed buckle configured to connect to a first portion of the second shoulder strap, and a second adjustable buckle configured to connect to a second portion of the second shoulder strap. Each of the first adjustable buckle and the second adjustable buckle may have an adjustment mechanism configured for adjusting a length of the second portion of the first and second shoulder straps by selective frictional engagement with the second portion of the first and second shoulder straps.

In some non-limiting embodiments or aspects, the first shoulder strap and the second shoulder strap may be arranged in an X-shaped configuration at a front portion of the harness. The adjustment mechanism may have a frame having terminal ends connected to a body of each of the first connector and the second connector with an opening defined between a central portion of the frame and the body of the first connector and the second connector. The adjustment mechanism may further have an adjustment bar extending across the opening and movably engaged with the terminal ends of the frame. The adjustment bar may have an elongated body movably engaged with the terminal ends of the frame. The elongated body may be positioned within a slot of the frame. Each of the first fixed buckle and the second fixed buckle may have a bar spaced apart from a body of the first connector and the second connector by a gap. The bar of each the first fixed buckle and the second fixed buckle may be connected to the body of the first connector and the second connector by a pair of posts.

In some non-limiting embodiments or aspects, the first connector and the second connector may be removably connectable to each other via a locking and release mechanism between a first, locked configuration, where the first connector and the second connector are connected to each other, and a second, unlocked configuration, where the first connector and the second connector are disconnected from each other. The first connector may have a first portion of a locking and release mechanism, and the second connector may have a second portion of the locking and release mechanism. The first portion of the locking and release mechanism may have a tab having a first end connected to the body of the first connector and a second, free end protruding away from the body of the first connector, and a first latch at the second end of the tab and protruding laterally outward relative to at least one lateral side of the tab. The second portion of the locking and release mechanism may have an upper plate and a lower plate defining a slot therebetween and configured for receiving at least a portion of the tab, and a pair of locking arms disposed within at least a portion of the slot and configured for interacting with the tab. The pair of locking arms may be movable between a first, locked position and a second, unlocked position to allow movement of at least a portion of the tab into and out of the slot. Each of the pair of locking arms may have a locking tooth at a first end and a release tab at a second end with a pivot pin positioned between the locking tooth and the release tab such that each locking arm is pivotally movable about the pivot pin. Each of the pair of locking arms may be biased to the first position by a biasing member.

In some non-limiting embodiments or aspects, a connection arrangement for use with a wearable body harness may have a first connector having a body with a first portion of a locking and release mechanism, and a second connector having a body with a second portion of the locking and release mechanism. The first portion of the locking and release mechanism may have a tab having a first end connected to the body of the first connector and a second, free end protruding away from the body of the first connector, and a first latch at the second end of the tab and protruding laterally outward relative to at least one lateral side of the tab. The second portion of the locking and release mechanism may have an upper plate and a lower plate defining a slot therebetween and configured for receiving at least a portion of the tab, and a pair of locking arms disposed within at least a portion of the slot and configured for interacting with the tab, the pair of locking arms movable between a first, locked position and a second, unlocked position to allow movement of at least a portion of the tab into and out of the slot. The first portion of the locking and release mechanism may be configured for interacting with the second portion of the locking and release mechanism to removably engage the first connector and the second connector between a first, locked configuration, where the first connector and the second connector are connected to each other, and a second, unlocked configuration, where the first connector and the second connector are disconnected from each other.

In other non-limiting embodiments or aspects, each of the pair of locking arms may have a locking tooth at a first end and a release tab at a second end with a pivot pin positioned between the locking tooth and the release tab such that each locking arm is pivotally movable about the pivot pin. The locking arms may be positioned within the slot such that the locking tooth of a first of the pair of locking arms is positioned opposite the locking tooth of a second of the pair of locking arms such that the locking teeth are spaced apart from each other in the first, locked position of the locking arms at a distance that is less than a width of the first latch of the tab. A first of the pair of locking arms may be independently movable of the second of the pair of locking arms. The tab may be removable from the slot only when both locking arms are in the second, unlocked position. Each of the pair of locking arms may be biased to the first position by a biasing member.

In other non-limiting embodiments or aspects, the tab may have an upper side having a first shape and a lower side having a second shape different than the first shape of the upper side. The lower plate of the second connector may have a recess shaped to receive the lower side of the tab when the tab is inserted into the slot. An indicator may be provided on the upper side of the tab. The upper plate may have an opening extending through the upper plate and into the slot. When the first connector is connected to the second connector, the indicator on the upper side of the tab of the first connector may be visible through the opening on the upper plate of the second connector.

In other non-limiting embodiments or aspects, the body of each of the first connector and the second connector may have at least one fixed buckle configured for receiving at least a portion of a harness webbing therethrough. The at least one fixed buckle may have a bar spaced apart from the body of each of the first connector and the second connector by a gap and a pair of posts connecting terminal ends of the bar to the body of each of the first connector and the second connector. The body of each of the first connector and the second connector may have at least one adjustable buckle configured for receiving at least a portion of a harness webbing therethrough. The adjustable buckle may have an adjustment mechanism configured for adjusting a position of at least one strap of the harness by selective frictional engagement with the at least one strap of the harness. The adjustment mechanism may have a frame connected at its terminal ends to the body of each of the first connector and the second connector with an opening between a central portion of the frame and the body of each of the first connector and the second connector, and an adjustment bar extending across the opening and movably engaged with the terminal ends of the frame. The adjustment bar may have an elongated body with terminal ends positioned within a slot of the frame.

In other non-limiting embodiments or aspects, a wearable body harness having a plurality of straps may have a first shoulder strap and a second shoulder strap. A first connector may be on the first shoulder strap, with the first connector having a body with a first portion of a locking and release mechanism. A second connector may be on the second shoulder strap, with the second connector having a body with a second portion of the locking and release mechanism. The first shoulder strap and the second shoulder strap may be removably connectable to each other with engagement of the first connector and the second connector. The first portion of the locking and release mechanism may have a tab having a first end connected to the body of the first connector and a second, free end protruding away from the body of the first connector, and a first latch at the second end of the tab and protruding laterally outward relative to at least one lateral side of the tab. The second portion of the locking and release mechanism may have an upper plate and a lower plate defining a slot therebetween and configured for receiving at least a portion of the tab, and a pair of locking arms disposed within at least a portion of the slot and configured for interacting with the tab, the pair of locking arms movable between a first, locked position and a second, unlocked position to allow movement of at least a portion of the tab into and out of the slot.

In other non-limiting embodiments or aspects, the first shoulder strap may have a first portion connected to a first end of the first connector and a second portion connected to a second end of the first connector, the second shoulder strap may have a first portion connected to a first end of the second connector and a second portion connected to a second end of the second connector. The first shoulder strap and the second shoulder strap may be arranged in an X-shaped configuration at a front portion of the harness.

In other non-limiting embodiments or aspects, each of the pair of locking arms may have a locking tooth at a first end and a release tab at a second end with a pivot pin positioned between the locking tooth and the release tab such that each locking arm is pivotally movable about the pivot pin. The locking arms may be positioned within the slot such that the locking tooth of a first of the pair of locking arms is positioned opposite the locking tooth of a second of the pair of locking arms such that the locking teeth are spaced apart from each other in the first, locked position of the locking arms at a distance that is less than a width of the first latch of the tab. The tab may have an upper side having a first shape and a lower side having a second shape different than the first shape of the upper side. The lower plate of the second connector may have a recess shaped to receive the lower side of the tab when the tab is inserted into the slot.

Further non-limiting embodiments or aspects are set forth in the following numbered clauses.

Clause 1: A connection arrangement for use with a wearable body harness, the connection arrangement comprising: a first connector comprising: a first fixed buckle configured to connect to a first portion of a first shoulder strap of the wearable body harness; and a first adjustable buckle configured to connect to a second portion of the first shoulder strap; and a second connector removably connectable to the first connector, the second connector comprising: a second fixed buckle configured to connect to a first portion of a second shoulder strap of the wearable body harness; and a second adjustable buckle configured to connect to a second portion of the second shoulder strap, wherein each of the first adjustable buckle and the second adjustable buckle comprises an adjustment mechanism configured for adjusting a length of the second portion of the first and second shoulder straps by selective frictional engagement with the second portion of the first and second shoulder straps.

Clause 2: The connection arrangement of clause 1, wherein the adjustment mechanism comprises: a frame having terminal ends connected to a body of each of the first connector and the second connector with an opening defined between a central portion of the frame and the body of the first connector and the second connector, and an adjustment bar extending across the opening and movably engaged with the terminal ends of the frame.

Clause 3: The connection arrangement of clause 2, wherein the adjustment bar has an elongated body movably engaged with the terminal ends of the frame.

Clause 4: The connection arrangement of clause 2 or clause 3, wherein the elongated body is positioned within a slot of the frame.

Clause 5: The connection arrangement of any of clauses 1-4, wherein each of the first fixed buckle and the second fixed buckle comprises a bar spaced apart from a body of the first connector and the second connector by a gap.

Clause 6: The connection arrangement of any of clauses 1-5, wherein the bar of each the first fixed buckle and the second fixed buckle is connected to the body of the first connector and the second connector by a pair of posts.

Clause 7: The connection arrangement of any of clauses 1-6, wherein the first connector and the second connector are removably connectable to each other via a locking and release mechanism between a first, locked configuration, where the first connector and the second connector are connected to each other, and a second, unlocked configuration, where the first connector and the second connector are disconnected from each other.

Clause 8: The connection arrangement of any of clauses 1-7, wherein the first connector has a first portion of a locking and release mechanism, and wherein the second connector has a second portion of the locking and release mechanism, wherein the first portion of the locking and release mechanism comprises: a tab having a first end connected to the body of the first connector and a second, free end protruding away from the body of the first connector, and a first latch at the second end of the tab and protruding laterally outward relative to at least one lateral side of the tab, and wherein the second portion of the locking and release mechanism comprises: an upper plate and a lower plate defining a slot therebetween and configured for receiving at least a portion of the tab, and a pair of locking arms disposed within at least a portion of the slot and configured for interacting with the tab, the pair of locking arms movable between a first, locked position and a second, unlocked position to allow movement of at least a portion of the tab into and out of the slot.

Clause 9: The connection arrangement of any of clauses 1-8, wherein each of the pair of locking arms has a locking tooth at a first end and a release tab at a second end with a pivot pin positioned between the locking tooth and the release tab such that each locking arm is pivotally movable about the pivot pin.

Clause 10: The connection arrangement of any of clauses 1-9, wherein each of the pair of locking arms is biased to the first position by a biasing member.

Clause 11: A wearable body harness having a plurality of straps comprising: a first shoulder strap and a second shoulder strap; a first connector on the first shoulder strap; and a second connector on the second shoulder strap, the first shoulder strap and the second shoulder strap being removably connectable to each other with engagement of the first connector and the second connector, wherein the first connector comprises: a first fixed buckle configured to connect to a first portion of the first shoulder strap; and a first adjustable buckle configured to connect to a second portion of the first shoulder strap, wherein the second connector comprises: a second fixed buckle configured to connect to a first portion of the second shoulder strap; and a second adjustable buckle configured to connect to a second portion of the second shoulder strap, and wherein each of the first adjustable buckle and the second adjustable buckle comprises an adjustment mechanism configured for adjusting a length of the second portion of the first and second shoulder straps by selective frictional engagement with the second portion of the first and second shoulder straps.

Clause 12: The wearable body harness of clause 11, wherein the first shoulder strap and the second shoulder strap are arranged in an X-shaped configuration at a front portion of the harness.

Clause 13: The wearable body harness of clause 11 or 12, wherein the adjustment mechanism comprises: a frame having terminal ends connected to a body of each of the first connector and the second connector with an opening defined between a central portion of the frame and the body of the first connector and the second connector, and an adjustment bar extending across the opening and movably engaged with the terminal ends of the frame.

Clause 14: The wearable body harness of any of clauses 11-13, wherein the adjustment bar has an elongated body movably engaged with the terminal ends of the frame.

Clause 15: The wearable body harness of any of clauses 11-14, wherein the elongated body is positioned within a slot of the frame.

Clause 16: The wearable body harness of any of clauses 11-15, wherein each of the first fixed buckle and the second fixed buckle comprises a bar spaced apart from a body of the first connector and the second connector by a gap.

Clause 17: The wearable body harness of any of clauses 11-16, wherein the bar of each the first fixed buckle and the second fixed buckle is connected to the body of the first connector and the second connector by a pair of posts.

Clause 18: The wearable body harness of any of clauses 11-17, wherein the first connector and the second connector are removably connectable to each other via a locking and release mechanism between a first, locked configuration, where the first connector and the second connector are connected to each other, and a second, unlocked configuration, where the first connector and the second connector are disconnected from each other.

Clause 19: The wearable body harness of any of clauses 11-18, wherein the first connector has a first portion of a locking and release mechanism, and wherein the second connector has a second portion of the locking and release mechanism, wherein the first portion of the locking and release mechanism comprises: a tab having a first end connected to the body of the first connector and a second, free end protruding away from the body of the first connector, and a first latch at the second end of the tab and protruding laterally outward relative to at least one lateral side of the tab, and wherein the second portion of the locking and release mechanism comprises: an upper plate and a lower plate defining a slot therebetween and configured for receiving at least a portion of the tab, and a pair of locking arms disposed within at least a portion of the slot and configured for interacting with the tab, the pair of locking arms movable between a first, locked position and a second, unlocked position to allow movement of at least a portion of the tab into and out of the slot.

Clause 20: The wearable body harness of any of clauses 11-19, wherein each of the pair of locking arms has a locking tooth at a first end and a release tab at a second end with a pivot pin positioned between the locking tooth and the release tab such that each locking arm is pivotally movable about the pivot pin.

Clause 21: A connection arrangement for use with a wearable body harness, the connection arrangement comprising: a first connector having a body with a first portion of a locking and release mechanism; and a second connector having a body with a second portion of the locking and release mechanism, wherein the first portion of the locking and release mechanism comprises: a tab having a first end connected to the body of the first connector and a second, free end protruding away from the body of the first connector, and a first latch at the second end of the tab and protruding laterally outward relative to at least one lateral side of the tab, and wherein the second portion of the locking and release mechanism comprises: an upper plate and a lower plate defining a slot therebetween and configured for receiving at least a portion of the tab, and a pair of locking arms disposed within at least a portion of the slot and configured for interacting with the tab, the pair of locking arms movable between a first, locked position and a second, unlocked position to allow movement of at least a portion of the tab into and out of the slot.

Clause 22: The connection arrangement of clause 21, wherein the first portion of the locking and release mechanism is configured for interacting with the second portion of the locking and release mechanism to removably engage the first connector and the second connector between a first, locked configuration, where the first connector and the second connector are connected to each other, and a second, unlocked configuration, where the first connector and the second connector are disconnected from each other.

Clause 23: The connection arrangement of clause 21 or 22, wherein each of the pair of locking arms has a locking tooth at a first end and a release tab at a second end with a pivot pin positioned between the locking tooth and the release tab such that each locking arm is pivotally movable about the pivot pin.

Clause 24: The connection arrangement of any of clauses 21-23, wherein the locking arms are positioned within the slot such that the locking tooth of a first of the pair of locking arms is positioned opposite the locking tooth of a second of the pair of locking arms such that the locking teeth are spaced apart from each other in the first, locked position of the locking arms at a distance that is less than a width of the first latch of the tab.

Clause 25: The connection arrangement of any of clauses 21-24, wherein a first of the pair of locking arms is independently movable of the second of the pair of locking arms, and wherein the tab is removable from the slot only when both locking arms are in the second, unlocked position.

Clause 26: The connection arrangement of any of clauses 21-25, wherein each of the pair of locking arms is biased to the first position by a biasing member.

Clause 27: The connection arrangement of any of clauses 21-26, wherein the tab has an upper side having a first shape and a lower side having a second shape different than the first shape of the upper side.

Clause 28: The connection arrangement of any of clauses 21-27, wherein the lower plate of the second connector has a recess shaped to receive the lower side of the tab when the tab is inserted into the slot.

Clause 29: The connection arrangement of any of clauses 21-28, further comprising an indicator on the upper side of the tab.

Clause 30: The connection arrangement of any of clauses 21-29, wherein the upper plate has an opening extending through the upper plate and into the slot, and wherein, when the first connector is connected to the second connector, the indicator on the upper side of the tab of the first connector is visible through the opening on the upper plate of the second connector.

Clause 31: The connection arrangement of any of clauses 21-30, wherein the body of each of the first connector and the second connector comprises at least one fixed buckle configured for receiving at least a portion of a harness webbing therethrough.

Clause 32: The connection arrangement of any of clauses 21-31, wherein the at least one fixed buckle has a bar spaced apart from the body of each of the first connector and the second connector by a gap and a pair of posts connecting terminal ends of the bar to the body of each of the first connector and the second connector.

Clause 33: The connection arrangement of any of clauses 21-32, wherein the body of each of the first connector and the second connector comprises at least one adjustable buckle configured for receiving at least a portion of a harness webbing therethrough, the adjustable buckle having an adjustment mechanism configured for adjusting a position of at least one strap of the harness by selective frictional engagement with the at least one strap of the harness.

Clause 34: The connection arrangement of any of clauses 21-33, wherein the adjustment mechanism comprises a frame connected at its terminal ends to the body of each of the first connector and the second connector with an opening between a central portion of the frame and the body of each of the first connector and the second connector, and an adjustment bar extending across the opening and movably engaged with the terminal ends of the frame.

Clause 35: The connection arrangement of any of clauses 21-34, wherein the adjustment bar has an elongated body with terminal ends positioned within a slot of the frame.

Clause 36: A wearable body harness having a plurality of straps comprising: a first shoulder strap and a second shoulder strap; a first connector on the first shoulder strap, the first connector having a body with a first portion of a locking and release mechanism; and a second connector on the second shoulder strap, the second connector having a body with a second portion of the locking and release mechanism, wherein the first shoulder strap and the second shoulder strap are removably connectable to each other with engagement of the first connector and the second connector, wherein the first portion of the locking and release mechanism comprises: a tab having a first end connected to the body of the first connector and a second, free end protruding away from the body of the first connector, and a first latch at the second end of the tab and protruding laterally outward relative to at least one lateral side of the tab, and wherein the second portion of the locking and release mechanism comprises: an upper plate and a lower plate defining a slot therebetween and configured for receiving at least a portion of the tab, and a pair of locking arms disposed within at least a portion of the slot and configured for interacting with the tab, the pair of locking arms movable between a first, locked position and a second, unlocked position to allow movement of at least a portion of the tab into and out of the slot.

Clause 37: The wearable body harness of clause 36, wherein the first shoulder strap has a first portion connected to a first end of the first connector and a second portion connected to a second end of the first connector, and wherein the second shoulder strap has a first portion connected to a first end of the second connector and a second portion connected to a second end of the second connector.

Clause 38: The wearable body harness of clause 36 or 37, wherein the first shoulder strap and the second shoulder strap are arranged in an X-shaped configuration at a front portion of the harness.

Clause 39: The wearable body harness of any of clauses 36-38, wherein each of the pair of locking arms has a locking tooth at a first end and a release tab at a second end with a pivot pin positioned between the locking tooth and the release tab such that each locking arm is pivotally movable about the pivot pin, and wherein the locking arms are positioned within the slot such that the locking tooth of a first of the pair of locking arms is positioned opposite the locking tooth of a second of the pair of locking arms such that the locking teeth are spaced apart from each other in the first, locked position of the locking arms at a distance that is less than a width of the first latch of the tab.

Clause 40: The wearable body harness of any of clauses 36-39, wherein the tab has an upper side having a first shape and a lower side having a second shape different than the first shape of the upper side, and wherein the lower plate of the second connector has a recess shaped to receive the lower side of the tab when the tab is inserted into the slot.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

In FIGS. 1-6B, like characters refer to the same components and elements, as the case may be, unless otherwise stated.

DETAILED DESCRIPTION OF THE DISCLOSURE

Figure 1:
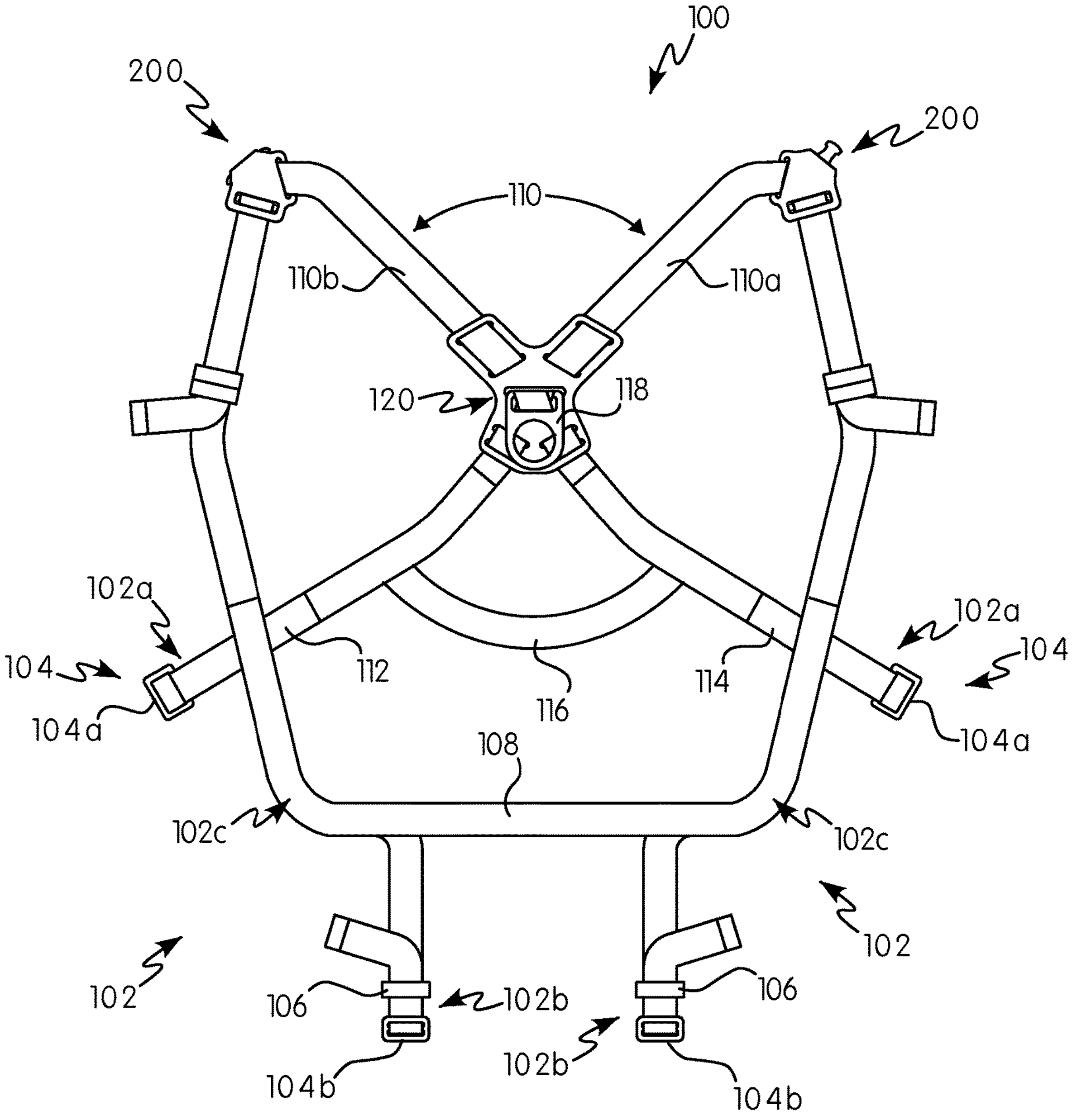
FIG. 1 is a front perspective view of a wearable body harness in accordance with some non-limiting embodiments or aspects of the present disclosure.

As used herein, the singular form of "a", "an", and "the" include plural referents unless the context clearly dictates otherwise.

Spatial or directional terms, such as "left", "right", "inner", "outer", "above", "below", and the like, relate to the embodiments or aspects as shown in the drawing figures and are not to be considered as limiting as the disclosure can assume various alternative orientations.

All numbers and ranges used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

The term "at least" is synonymous with "greater than or equal to".

The term "not greater than" is synonymous with "less than or equal to".

As used herein, "at least one of" is synonymous with "one or more of". For example, the phrase "at least one of A, B, and C" means any one of A, B, or C, or any combination of any two or more of A, B, or C. For example, "at least one of A, B, and C" includes A alone; or B alone; or C alone; or A and B; or A and C; or B and C; or all of A, B, and C.

The term "includes" is synonymous with "comprises".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

The discussion of the disclosure may describe certain features as being "particularly" or "preferably" within certain limitations (e.g., "preferably", "more preferably", or "even more preferably", within certain limitations). It is to be understood that the disclosure is not limited to these particular or preferred limitations but encompasses the entire scope of the disclosure.

In various non-limiting embodiments or aspects, and with reference to FIG. 1, the present disclosure is directed to a safety harness 100 (hereinafter referred to as "harness 100") used in a fall protection system. As discussed herein, the harness 100 has a harness connection arrangement configured for releasably coupling at least a pair of straps of the harness 100. Preferably, the harness 100 has a harness connection arrangement for connecting at least two straps of the harness, wherein the harness connection arrangement can be easily and effectively connected and disconnected to allow quick donning and removal of the harness 100.

With continued reference to FIG. 1, the harness 100 has at least two leg straps 102 configured to attach around a user's legs below a user's groin area. When attached, the leg straps 102 loop around or encircle each of the user's legs. Each leg strap 102 has a first end 102*a* that is removably attachable to a second end 102*b* via a connector 104. In some non-limiting embodiments or aspects, the connector 104 may be a clip, a buckle, a mating arrangement, an actuatable structure, or the like. The connector 104 permits removable attachment of the first end 102*a* to the second end 102*b* of each leg strap 102. In this manner, the first and second ends 102*a*, 102*b* of the leg straps 102 are configured to be removably attached to each other and configured to be free floating when detached from each other. In some non-limiting embodiments or aspects, at least one connector 104 and/or the leg strap 102 may have at least one connection mechanism 106 configured for adjusting the length of each leg strap 102. In this manner, the at least one connection mechanism 106 adjusts a distance between the first end 102*a* and the second end 102*b* such that each leg strap 102 may be adjusted to fit comfortably around the user's legs. Each leg strap 102 may be formed from a substantially flat webbing material typically used in harness construction. One or more handles, clips, and/or connectors (not shown) may be provided on at least a portion of the harness 100. The harness 100 may include padding (not shown) for increasing the user's comfort while wearing the harness 100.

In various non-limiting embodiments or aspects, the leg straps 102 (or, indeed, any of the straps in the harness 100) may be linear lengths of material, folded straps that form loops with the at least one connector 104 at the first end 102*a* and/or the second end 102*b*, or the like. For example, as shown in FIG. 1, the connector 104 may have a first portion 104*b* that is adjustably attached to the first end 102*b* of at least one leg strap 102 through a loop of the material that makes up the leg strap 102, while a second portion 104*a* of the connector 104 is non-adjustably secured at the second end 102*b* of at least one leg strap 102. Therefore, in such an arrangement, the first portion 104*b* of the connector 104 and the loop of material that makes up the leg strap 102 at the second end 102*b* defines the at least one connection mechanism 106 for adjusting a length of the leg strap 102. It should be noted that the position of the connection mechanism 106 may be reversed such that the second portion 104*a* of the connector 104 is provided on the first end 102*a* of the leg strap 102. At least one leg strap 102 may include padding (not shown) for increasing the user's comfort while wearing the harness 100.

With continued reference to FIG. 1, each leg strap 102 is connected to a seat strap 108 at a substantially intermediate portion 102*c* of the leg strap 102 between the first end 102*a* and the second end 102*b*. In some non-limiting embodiments or aspects, the substantially intermediate portion 102*c* of the leg strap 102 may be directly and non-movably connected to a seat strap 108, such as being sewn directly to the seat strap 108. In other non-limiting embodiments or aspects, the substantially intermediate portion 102*c* of each leg strap 102 may be connected to the rear end of the seat strap 108 by a connection strap (not shown) to allow the substantially intermediate portion 102*c* of the leg strap 102 to slidably move along a front portion of the leg strap 102. Accordingly, the position of the leg straps 102 may be adjusted relative to the seat strap 108 to increase the user's comfort while wearing the harness 100.

With continued reference to FIG. 1, the harness 100 further has a shoulder strap 110 configured to extend over at least a portion of the user's shoulders. The shoulder strap 110 may have a first shoulder strap 110*a* and a second shoulder strap 110*b* arranged to overlap one another in an X-shaped configuration, with the shoulder straps 110*a*, 110*b* configured to be connected together at the user's chest area. As described herein, the first and second shoulder straps 110*a*, 110*b* may be releasably connected together by a connection arrangement. In some non-limiting embodiments or aspects, the shoulder strap 110 may have at least one shoulder pad 120 having one or more openings through which the first shoulder strap 110*a* and the second shoulder strap 110*b* can be arranged to maintain the first shoulder strap 110*a* and the second shoulder strap 110*b* in the X-shaped configuration.

As further shown in FIG. 1, the first shoulder strap 110*a* has a first end 112 that is connected to the first end 102*a* of a first leg strap 102. The first end 112 of the first shoulder strap 110*a* may be removably or non-removably attachable to the first end 102*a* of a first leg strap 102. In some non-limiting embodiments or aspects, the first end 112 of the first shoulder strap 110*a* may be attached to the first end 102*a* of a first leg strap 102 via a connector similar to the connector 104 described herein with reference to the leg straps 102. At least a portion of the first shoulder strap 110*a* may be formed from a substantially flat webbing material typically used in harness construction.

With continued reference to FIG. 1, the second shoulder strap 110*b* has a first end 114 that is connected to the first end 102*a* of the second leg strap 102. The first end 114 of the second shoulder strap 110*b* may be removably or non-removably attachable to the first end 102*a* of the second leg strap 102. In some embodiments or aspects, the first end 114 of the second shoulder strap 110*b* may be attached to the first end 102*a* of the second leg strap 102 via a connector similar to the connector 104 described herein with reference to the leg straps 102. At least a portion of the second shoulder strap 110*b* may be formed from a substantially flat webbing material typically used in harness construction.

As further shown in FIG. 1, the harness 100 may have a back strap 116 connecting a substantially intermediate portion of the first shoulder strap 110*a* between its first end 112 with a substantially intermediate portion of the second shoulder strap 110*b* between its first end 114. In some non-limiting embodiments or aspects, a position of the back strap 116 may be fixed relative to the shoulder straps 110*a*, 110*b*. In other non-limiting embodiments or aspects, a position of the back strap 116 may be adjustable along a longitudinal direction of the first shoulder strap 110*a* and the second shoulder strap 110*b*, such as by sliding the back strap 116 along the first shoulder strap 110*a* and/or the second shoulder strap 110*b*.

With continued reference to FIG. 1, the first and second shoulder straps 110*a*, 110*b* may be connectable together at a front portion of the harness 100 in an area of the user's chest. In some non-limiting embodiments or aspects, the first and second shoulder straps 110*a*, 110*b* may have at least one connection arrangement 200 further described herein with reference to FIGS. 2A-6B.

As further shown in FIG. 1, the shoulder strap 110 has an anchor element, such as a D-ring 118, for connecting at least a portion of the shoulder strap 110 to a line connected to an anchor point. In some non-limiting embodiments or aspects, at least a portion of the first shoulder strap 110*a* and the second shoulder strap 110*b* is looped around or otherwise permanently attached to the D-ring 118. The D-ring 118 has a frame defining at least one opening through which the first shoulder strap 110*a* and the second shoulder strap 110*b* may be looped around and through which a clip, such as a carabiner, a lanyard, or other rope or line, can be secured to connect the harness 100 to an anchor point.

With reference to FIGS. 2A-2D, the harness connection arrangement 200 (hereinafter referred to as "connection arrangement 200") for use with a wearable body harness, such as the harness 100 shown in FIG. 1, is shown in accordance with one non-limiting embodiment or aspect of the present disclosure. The connection arrangement 200 is illustrated without harness straps for clarity. While in some non-limiting embodiments or aspects of the present disclosure the connection arrangement 200 is configured for connecting portions of the shoulder strap 110, such as the first shoulder strap and the second shoulder strap 110*a*, 110*b*, across the user's chest, the connection arrangement 200 can be used to connect any two or more straps of the harness 100.

With continued reference to FIGS. 2A-2D, the connection arrangement 200 has a first connector 202 removably connectable to a second connector 204. Together, the first connector 202 and the second connector 204 define a locking and release mechanism 201. As described herein, the first and second connectors 202, 204 are engageable between a first, locked configuration, where the first and second connectors 202, 204 are connected to each other, and a second, unlocked configuration, where the first and second connectors 202, 204 are disconnected from each other. The first and second connectors 202, 204 can be connected to one another by actuating a locking and release mechanism 201 discussed herein. In various non-limiting embodiments or aspects, the connection arrangement 200 may be made from metal, plastic, a composite material, and any combination thereof.

Figure 3A:
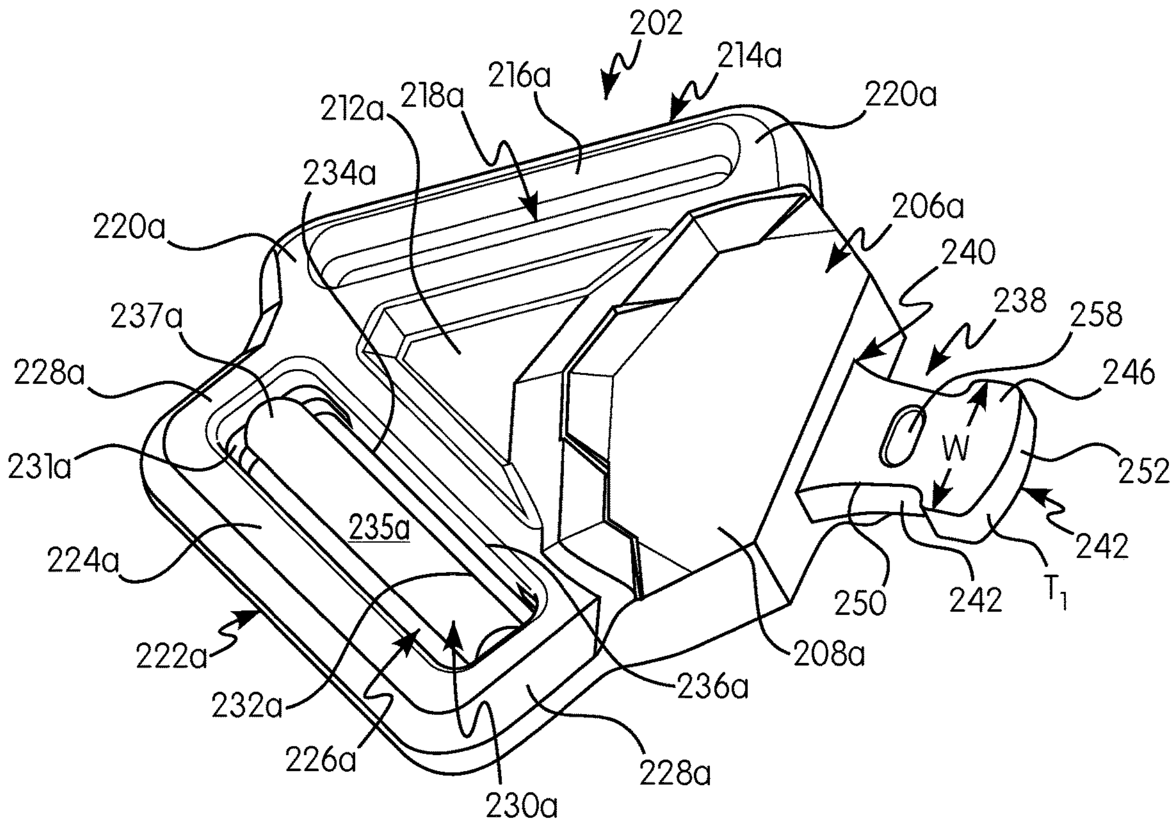
FIG. 3A is a front perspective view of a first connector of the harness connection arrangement of FIGS. 2A-2D.
Figure 3B:
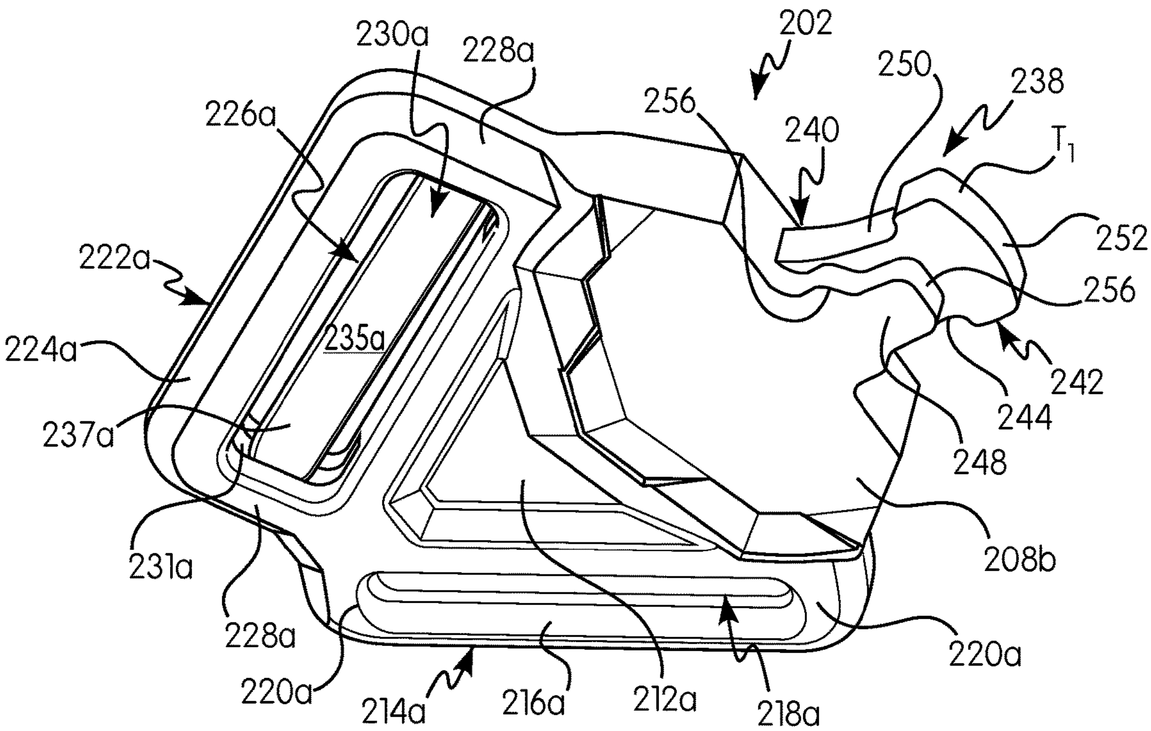
FIG. 3B is a rear perspective view of the first connector shown in FIG. 3A.

With reference to FIGS. 3A-3B, the first connector 202 is shown separate from the second connector 204 of the connection arrangement 200. The first connector 202 has a first body 206*a* with a first side 208*a* opposite a second side 210*a* (shown in FIG. 3B). In some non-limiting embodiments or aspects, the first side 208*a* may face away from a body of the user while a second side 210*a* may face toward a body of the user when the first connector 202 is installed on a harness worn by the user. While FIGS. 3A-3B show the first body 206*a* of the first connector 202 being substantially planar, the first body 206*a* may have a non-planar shape in other non-limiting embodiments or aspects. The first body 206*a* may be monolithically formed as a single, integral piece. In other non-limiting embodiments or aspects, the first body 206*a* of the first connector 202 may be formed from two or more components that are removably or non-removably connected together. In various non-limiting embodiments or aspects, the first body 206*a* of the first connector 202 may be made from metal, plastic, a composite material, and any combination thereof.

With continued reference to FIGS. 3A-3B, the first body 206*a* of the first connector 202 has a substantially triangular shape. In other non-limiting embodiments or aspects, the first body 206*a* may have any other shape, such as a circular shape, an oval shape, a rectangular shape, or any other regular or irregular geometric shape. In non-limiting embodiments or aspects, a recess 212*a* may be provided on the first body 206*a*. In some non-limiting embodiments or aspects, the recess 212*a* is partially recessed into one or both of the first side 208*a* and the second side 210*a* of the first body 206*a*. In other non-limiting embodiments or aspects, the recess 212*a* extends through the entire first body 206*a* between the first side 208*a* and the second side 210*a*. The recess 212*a* may be shaped to correspond to the shape of the first body 206*a*. For example, in a first body 206*a* having a substantially triangular shape, the recess 212*a* may have a corresponding substantially triangular shape. In some non-limiting embodiments or aspects, the recess 212*a* may have a shape that is different than the shape of the first body 206*a* of the first connector 202. The recess 212*a* may be centered on the first body 206*a* or offset toward any side of the first body 206*a*.

With continued reference to FIGS. 3A-3B, the first connector 202 has at least one first fixed buckle 214*a* connected to the first body 206*a*. In some non-limiting embodiments or aspects, the at least one first fixed buckle 214*a* may be connected to one of the three sides of the first body 206*a* having a substantially triangular shape. The first fixed buckle 214*a* is configured for receiving at least a portion of a harness webbing therethrough, such as at least a portion of the shoulder strap 110 and/or a chest strap. In some non-limiting embodiments or aspects, the first fixed buckle 214*a* is configured to connect to a first portion of the first shoulder strap 110*a*. The first fixed buckle 214*a* may have a bar 216*a* that is spaced apart from the first body 206*a* of the first connector 202 such that the harness webbing may be inserted through a gap 218*a* formed between the bar 216*a* and the first body 206*a*. The bar 216*a* is connected to the first body 206*a* by posts 220*a*. The webbing is desirably looped through the gap 218*a* and around the bar 216*a* such that the webbing overlaps itself around the bar 216*a*. The overlapping ends of the webbing may be sewn together or otherwise attached to prevent removal of the webbing from the first fixed buckle 214*a*.

In some non-limiting embodiments or aspects, the at least one first fixed buckle 214*a* may be provided on an upper side and/or a lower side of the first connector 202 when the harness 100 (shown in FIG. 1) is worn by a user. In this manner, one or more straps may be connected to the at least one first fixed buckle 214*a* from above or below the first connector 202. In FIGS. 3A-3B, the at least one first fixed buckle 214*a* is provided on an upper side of the first connector 202 when the harness 100 is worn by the user.

With continued reference to FIGS. 3A-3B, the first connector 202 has at least one first adjustable buckle 222*a* connected to the first body 206*a*. In some non-limiting embodiments or aspects, the at least one first adjustable buckle 222*a* may be connected to one of the three sides of the first body 206*a* having a substantially triangular shape. The at least one first adjustable buckle 222*a* is configured for receiving at least a portion of a harness webbing therethrough, such as at least a portion of the shoulder strap 110 (shown in FIG. 1). In some non-limiting embodiments or aspects, the first fixed buckle 214*a* is configured to connect to a second portion of the first shoulder strap 110*a*. In some non-limiting embodiments or aspects, the at least one first adjustable buckle 222*a* has an adjustment mechanism associated therewith to permit an adjustment of at least one strap of the harness 100 (shown in FIG. 1) that is connected to the at least one first adjustable buckle 222*a*. In this manner, the length of the at least one strap of the harness 100 may be adjusted to suit the user's body shape. By allowing an adjustment of strap length directly on the first connector, a separate adjustment mechanism for regulating the length of the strap may be eliminated, thereby reducing the overall weight of the harness 100. The adjustment mechanism may be configured for permitting frictional adjustment of the at least one strap of the harness 100, as described herein.

With continued reference to FIGS. 3A-3B, the at least one first adjustable buckle 222*a* may have a frame 224*a* that is spaced apart from the first body 206*a* of the first connector 202 such that at least one strap of the harness 100 (shown in FIG. 1) may be inserted through an opening 226*a* formed between the frame 224*a* and the first body 206*a*. The frame 224*a* is connected to the first body 206*a* at its terminal ends 228*a*. The at least one first adjustable buckle 222*a* further has an adjustment bar 230*a* configured to permit adjustable movement of at least one strap of the harness 100. The adjustment bar 230*a* extends across the opening 226*a* and is moveably engaged with the first adjustable buckle 222*a*, such as by sliding within a slot 231*a* of the frame 224*a*. The adjustment bar 230*a* is movable within the slot 231*a* and across the opening 226*a* between a first position closer to the first body 206*a* of the first connector 202 and a second position further away from the first body 206*a*. The adjustment bar 230*a* has an elongated body 235*a* with terminal ends 237*a* that are positioned within the slot 231*a*.

In use, at least one strap of the harness 100 is looped around the adjustment bar 230*a* and through the opening 226*a*. The adjustment bar 230*a* has a first contact surface 232*a* to contact a first surface of at least one strap of the harness 100, while a first end 234*a* of the frame 224*a* has a second contact surface 236*a* to contact a second surface opposite the first surface of the at least one strap of the harness 100 such that the at least one strap is wedged between the first contact surface 232*a* and the second contact surface 236*a* when the adjustment bar 230*a* is in the second position. The frictional contact between the at least one strap and the first contact surface 232*a* and the second contact surface 236*a* prevents the strap from moving relative to the first connector 202. Movement of the frame 224*a* changes an angle of at least one strap relative to the first contact surface 232*a* and the second contact surface 236*a* to allow the adjustment bar 230*a* to be moved to the first position, thereby allowing the at least one strap to movably adjust relative to the first connector 202.

In some non-limiting embodiments or aspects, the at least one first adjustable buckle 222*a* may be provided on an upper side and/or a lower side of the first connector 202 when the harness 100 (shown in FIG. 1) is worn by a user. In this manner, one or more straps may be connected to the at least one fixed buckle 214*a* from above or below the first connector 202. In FIGS. 3A-3B, the at least one first adjustable buckle 222*a* is provided on a lower side of the first connector 202 when the harness 100 is worn by the user.

With continued reference to FIGS. 3A-3B, the first connector 202 has a first portion of a locking and release mechanism 201 (shown in FIGS. 2A-2D) configured for engaging the first connector 202 between the first, locked configuration, where the first connector 202 is connected to the second connector 204 (shown in FIGS. 2A-2B) and a second, unlocked configuration, where the first connector 202 is disconnected from the second connector 204. The first connector 202 has a tab 238 that is connected to the first body 206*a*. In some non-limiting embodiments or aspects, the tab 238 is substantially parallel and/or coplanar with a plane defined by the first body 206*a*. In other non-limiting embodiments or aspects, the tab 238 may be offset relative to a plane defined by the first body 206*a*. The tab 238 may be monolithically formed with the first body 206*a* of the first connector 202, or may be removably or non-removably attached to the first body 206*a*.

With continued reference to FIGS. 3A-3B, the tab 238 has a first end 240 connected to the first body 206*a* and a second, free end 242 protruding away from the first body 206*a*, with a frame 244 of the tab extending between the first end 240 and the second end 242. The frame 244 has a first or upper side 246 (shown in FIG. 3A) opposite a second or lower side 248 (shown in FIG. 3B). A thickness of the first or upper side 246, such as a thickness in a direction substantially perpendicular to the plane defined by the first body 206*a* of the first connector 202, may be the same or different than a thickness of the second or lower side 248 of the tab 238. In some non-limiting embodiments or aspects, the first or upper side 246 of the frame 244 may have a same shape as the second or lower side 248. In other non-limiting embodiments or aspects, the first or upper side 246 of the frame 244 may have a different shape than the second or lower side 248. For example, with reference to FIG. 3A, the first or upper side 246 may have a first base 250 having a substantially uniform width between the first end 240 and the second end 242, with a first latch 252 connected to the first base 250 at the second end 242. The first latch 252 is configured to interact with the locking teeth of the locking and release mechanism on the second connector 204, as described herein. A width of the first latch 252 is wider than a width of the base 250 such that the latch 252 protrudes laterally outward relative to one or both lateral sides of the base 250. An indicator 258 may be at least partially recessed into the first or upper side 246 of the frame 244 at the base 250 and/or the latch 252.

With reference to FIG. 3B, the second or lower side 248 may have a second base 254 having a width that narrows in a direction from the first end 240 toward the second end 242. A second latch 256 may be connected to the second base 254 at the second end 242. A width of the second latch 256 is narrower than a width of the first base 250 and the second base 254.

Figure 4A:
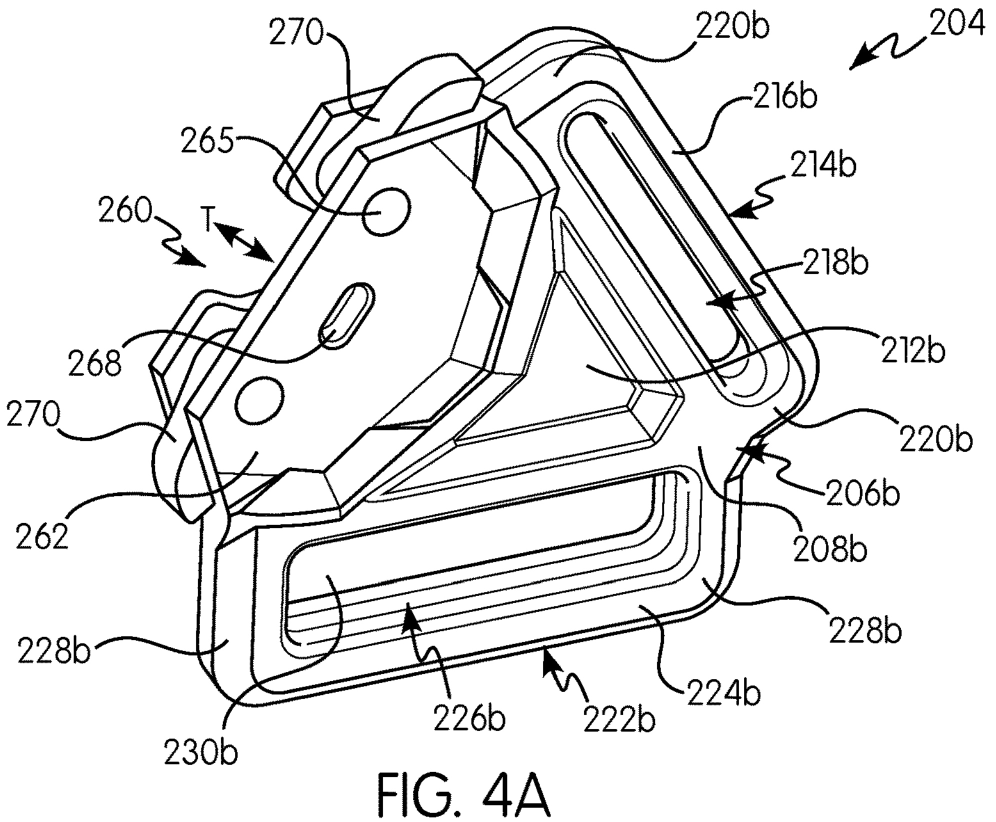
FIG. 4A is a front perspective view of a second connector of the harness connection arrangement of FIGS. 2A-2D.
Figure 4B:
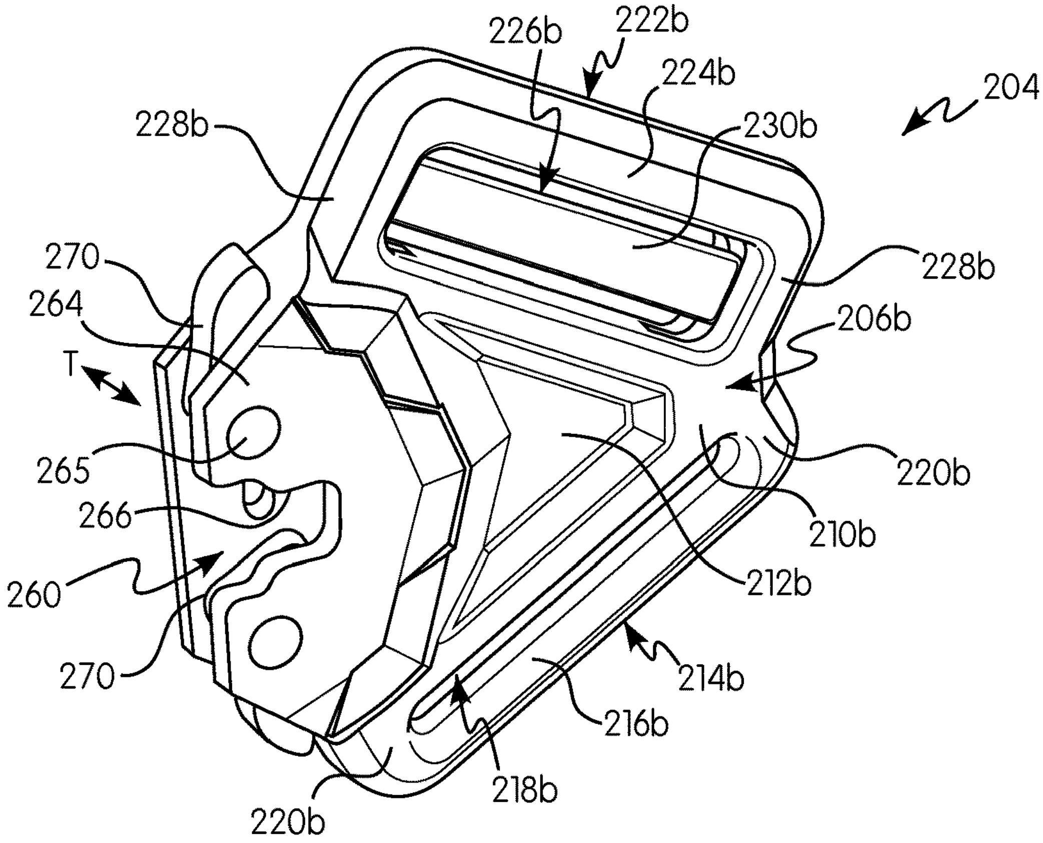
FIG. 4B is a rear perspective view of the second connector shown in FIG. 4A.

With reference to FIGS. 4A-4B, the second connector 204 is shown separate from the first connector 202 of the connection arrangement 200. Components of the second connector 204 shown in FIGS. 4A-4B are substantially similar or identical to the components of the first connector 202 described herein with reference to FIGS. 3A-3B. Reference numerals in FIGS. 4A-4B are used to illustrate identical components of the corresponding reference numerals in FIGS. 3A-3B, with the exception of an identifier "a" being replaced with an identifier "b". For example, whereas the body of the first connector 202 is identified with reference numeral 206*a*, the body of the second connector 204 is identified with reference numeral 206*b*. As the previous discussion regarding the first connector 202 generally shown in FIGS. 3A-3B is applicable to the second connector 204 shown in FIGS. 4A-4B, only the relative differences between the first and second connectors 202, 204 are discussed hereinafter.

With continued reference to FIGS. 4A-4B, the second connector 204 is shown separate from the first connector 202 of the connection arrangement 200. As described herein, the first and second connectors 202, 204 are engageable between a first, locked configuration, where the first and second connectors 202, 204 are connected to each other, and a second, unlocked configuration, where the first and second connectors 202, 204 are disconnected from each other. The first and second connectors 202, 204 can be connected to one another by actuating the locking and release mechanism discussed herein.

With continued reference to FIGS. 4A-4B, the second connector 204 has a second body 206*b* with a first side 208*b* opposite a second side 210*b*. In some non-limiting embodiments or aspects, the first side 208*b* may face away from a body of the user while a second side 210*b* may face toward a body of the user when the second connector 204 is installed on a harness worn by the user. While FIGS. 4A-4B show the second body 206*b* of the second connector 204 being substantially planar, the second body 206*b* may have a non-planar shape. In some non-limiting embodiments or aspects, the second body 206*b* may have a shape that corresponds to the shape of the first body 206*a* of the first connector 202. For example, the second body 206*b* of the second connector 204 may be a mirror image of the first body 206*a* of the first connector 202.

With continued reference to FIGS. 4A-4B, the second connector 204 has at least one second fixed buckle 214*b* connected to the second body 206*b*. The at least one second fixed buckle 214*b* may be substantially identical to the at least one first fixed buckle 214*a* on the first connector 202. Accordingly, a detailed description of the at least one second fixed buckle 214*b* will be omitted for brevity. The second fixed buckle 214*b* is configured for receiving at least a portion of a harness webbing therethrough, such as at least a portion of the shoulder harness 110 and/or the chest strap. In some non-limiting embodiments or aspects, the second fixed buckle 214*b* is configured to connect to a first portion of the second shoulder strap 110*b*.

With continued reference to FIGS. 4A-4B, the second connector 204 has at least one second adjustable buckle 222*b* connected to the second body 206*b*. The at least one second adjustable buckle 222*b* may be substantially identical to the at least one first adjustable buckle 222*a* on the first connector 202. Accordingly, a detailed description of the at least one second adjustable buckle 222*b* will be omitted for brevity. Together, the first and second fixed buckles 214*a*, 214*b* and the first and second adjustable buckles 222*a*, 222*b* allow for connection of four separate pieces of webbing of the harness 100, such as the first and second portions of the first shoulder strap 110*a* at the first connector 202 and the first and second portions of the second shoulder strap 110*b*. In addition, the first and second adjustable buckles 222*a*, 222*b* allow for adjusting a length of the second portion of the first and second shoulder straps 110*a*, 110*b* directly on the first and second connectors 202, 204, rather on separate adjustment mechanisms provided on the first and second shoulder straps 110*a*, 110*b* themselves.

Figure 2A:
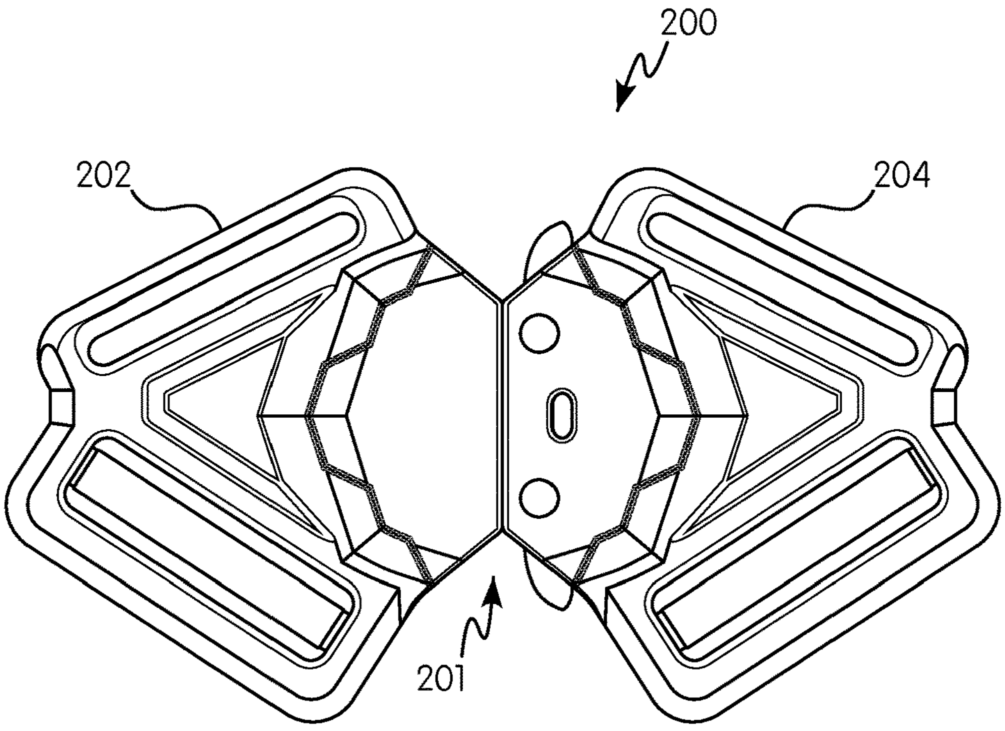
FIG. 2A is a front view of a harness connection arrangement for use with a wearable body harness in accordance with some non-limiting embodiments or aspects of the present disclosure showing a first connector and a second connector connected to each other.
Figure 2B:
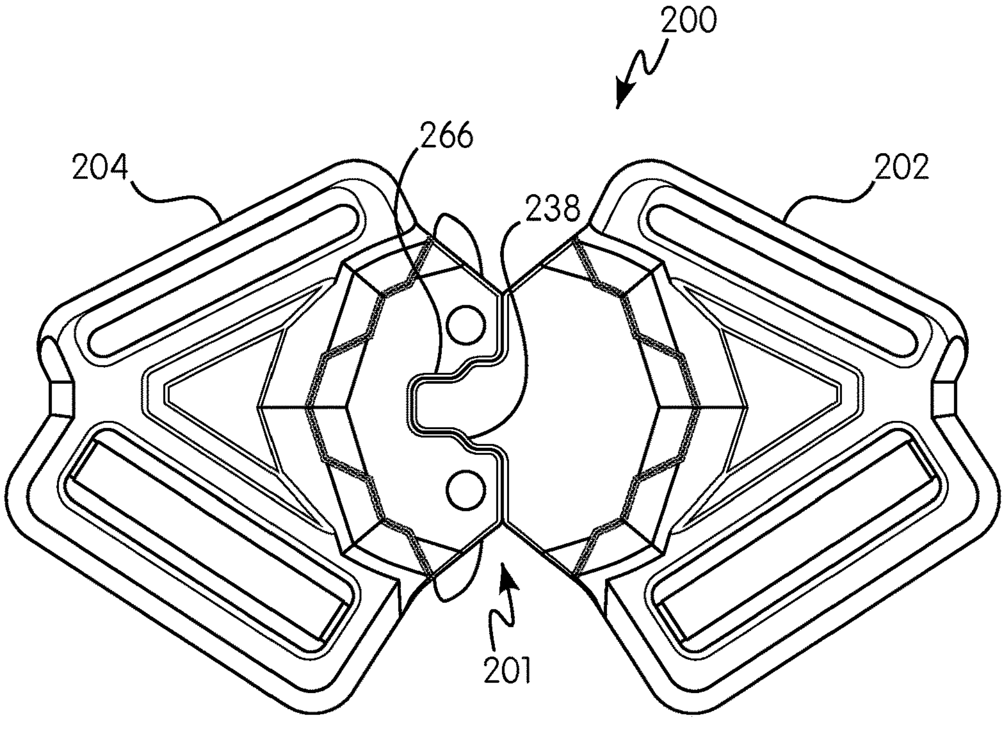
FIG. 2B is a rear view of the harness connection arrangement of FIG. 2A.
Figure 2C:
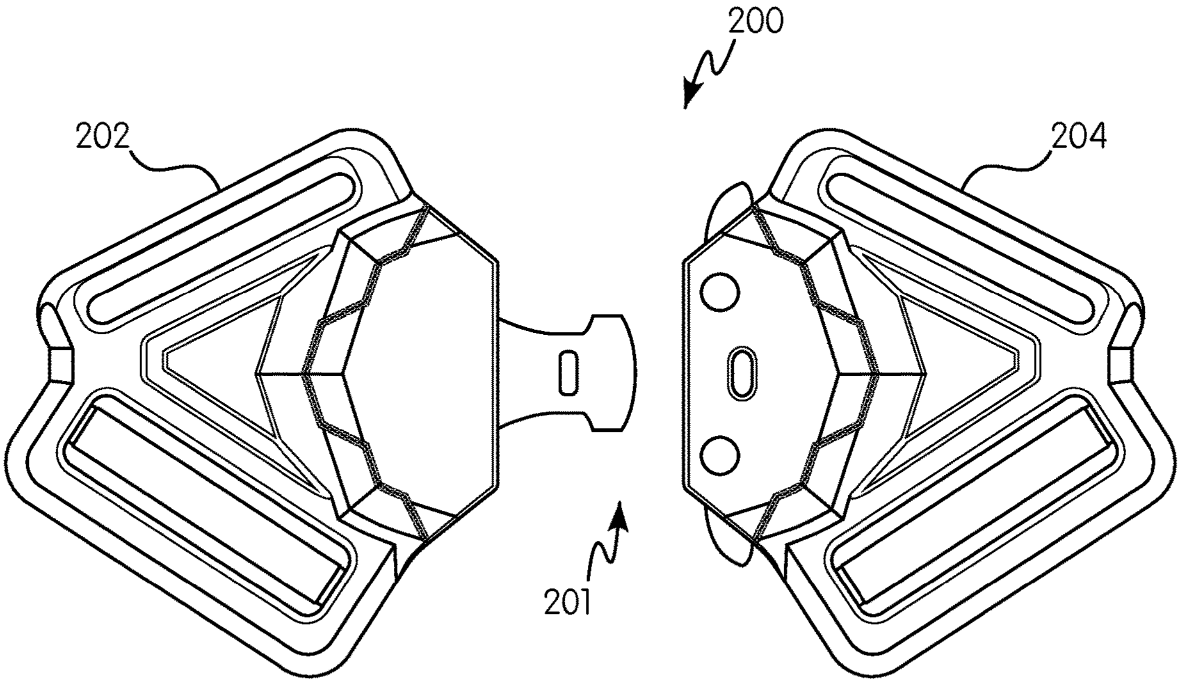
FIG. 2C is a front view of the harness connection arrangement of FIG. 2A showing the first connector and the second connector disconnected from each other.
Figure 2D:
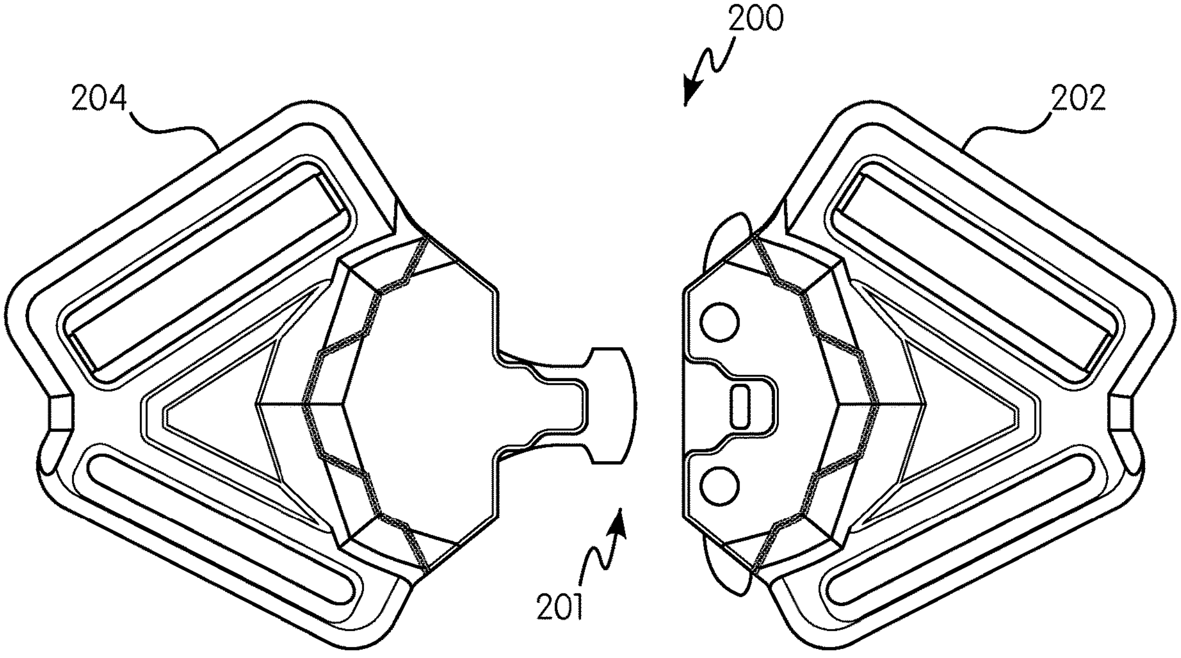
FIG. 2D is a rear view of the harness connection arrangement of FIG. 2C.

With continued reference to FIGS. 4A-4B, the second connector 204 has a second portion of the locking and release mechanism 201 (shown in FIGS. 2A-2B) configured for engaging with the first portion of the locking and release mechanism 201 on the first connector 202 between the first, locked configuration, where the first connector 202 is connected to the second connector 204 (shown in FIG. 2A) and a second, unlocked configuration, where the first connector 202 is disconnected from the second connector 204 (shown in FIG. 2B).

In some non-limiting embodiments or aspects, the second connector 204 has a slot 260 configured for removably receiving the tab 238 of the first connector 202. In some non-limiting embodiments or aspects, the slot 260 is defined by a space between an upper plate 262 and a lower plate 264. In some non-limiting embodiments or aspects, the upper plate 262 and the lower plate 264 may be connected together by one or more pins 265. A thickness T of the slot 260 in a direction substantially perpendicular to a plane defined by the second body 206*b* of the second connector 204 may be the same or larger than a thickness $T_1$ of the first or upper side 246 of the tab 238 of the first connector 202 (shown in FIGS. 3A-3B), and smaller than an overall thickness of the tab 238 of the first connector 202. In some non-limiting embodiments or aspects, and with reference to FIG. 4B, at least one of the upper plate 262 and the lower plate 264, such as the lower plate 264, may have a recess 266 having a shape that corresponds to the shape of at least a portion of the tab 238, such as the second or lower side 248 of the tab 238. In some non-limiting embodiments or aspects, the recess 266 is configured to receive at least a portion of the tab 238, such as the second or lower side 248 of the tab 238, when the tab 238 is inserted into the slot 260, such as during a locking connection of the first connector 202 with the second connector 204 (shown in FIG. 2B). In this manner, the first connector 202 and the second connector 204 can only be connected in one orientation, such as when the second or lower side 248 of the tab 238 is received within the recess 266.

With reference to FIG. 4A, at least one of the upper plate 262 and the lower plate 264, such as the upper plate 262, may have an opening 268 extending through the plate and into the slot 260. The opening 268 may be positioned on the upper plate 262 such that, when the tab 238 of the first connector 202 is fully inserted into the slot 260, the indicator 258 on the first or upper side 246 of the tab 238 is visible through the opening 268 (shown in FIG. 6A). In some non-limiting embodiments or aspects, the indicator 258 may be colored a conspicuous color, such as bright green, such that the indicator 258 is clearly visible through the opening 268 when the first and second connectors 202, 204 are locked together. Visibility of the indicator 258 through the opening 268 may provide an indication that the first and second connectors 202, 204 are locked together and cannot be disconnected without unlocking the locking and release mechanism 201, as described herein.

Figure 5:
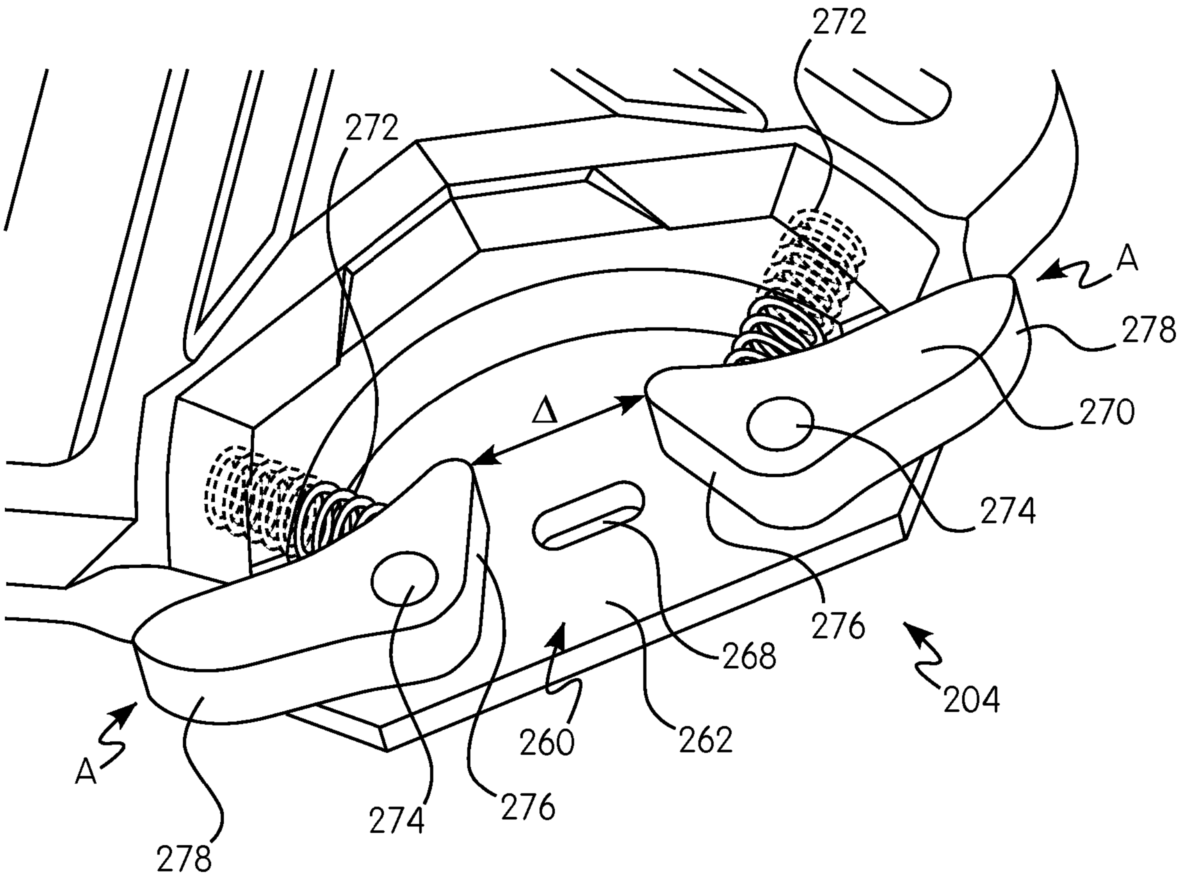
FIG. 5 is a front partial cross-sectional view of the second connector shown in FIG. 4A.

With reference to FIG. 5, and with continued reference to FIGS. 4A-4B, the second connector 204 has a second portion of the locking and release mechanism 201 that is configured for interacting with the first portion of the locking and release mechanism 201 on the first connector 202 (i.e., the tab 238). In some non-limiting embodiments or aspects, the second portion of the locking and release mechanism 201 has a pair of locking arms 270 that are configured to releasably engage the at least a portion of the tab 238, such as the first latch 252 of the tab 238 of the first connector 202. Each locking arm 270 is movable between a first, locked position, where disengagement of the first latch 252 of the tab 238 from the slot 260 of the second connector 204 is prevented due to interference between at least a portion of the locking arms 270 and the first latch 252, and a second, unlocked position (shown in FIG. 6B), where the first latch 252 of the tab 238 can be removed freely from the slot 260. Each locking arm 270 may be pivotally movable, rotatably movable, linearly movable, or movable in any direction via any combination of pivotal, rotatable, and linear movement between the first position and the second position.

With reference to FIG. 5, each of the locking arms 270 is biased in the first position by a biasing member 272, such as a spring. Movement of the locking arms 270 from the first position to the second position in the direction of arrows A in FIG. 5 builds a restoring force in the biasing members 272 such that each locking arm 270 is restored to the first position after the force that causes the movement of the locking arms 270 is removed. Each of the locking arms 270 may be pivotally mounted about a pivot pin 274 for movement between the first position and the second position.

With continued reference to FIG. 5, each locking arm 270 has an elongated shape with a locking tooth 276 on one end and a release tab 278 at an opposing end, with the pivot pin 274 positioned between the locking tooth 276 and the release tab 278. The locking arms 270 are arranged such that the locking teeth 276 are positioned opposite one another and spaced apart from each other in the first positon at a distance D that is less than a width W of the first latch 252 of the tab 238 (shown in FIG. 3A). In this manner, when the first latch 252 is inserted into the slot 260 and into a space between the locking arms 270, the first latch 252 will cause the locking arms 270 to pivot about their respective pivot pins 274 to deflect the locking arms 270 from the first position toward the second position. The locking teeth 276 may be angled relative to one another at an acute angle to facilitate movement of the locking arms 270 from the first position to the second position with the insertion of the first latch 252 in the slot 260 between the locking arms 270.

As shown in FIG. 5, at least a portion of each locking arm 270, such as the release tab 278, protrudes from the second body 206*b* of the second connector 204. In some non-limiting embodiments or aspects, the release tab 278 of each locking arm 270 may be exposed such that it can be actuated by a user. To actuate the release tabs 270, the user urges the release tabs 270 in the direction of arrows A shown in FIG. 5. Movement of the release tabs 278 in this direction moves the locking teeth 276 away from one another to enlarge the space between the locking arms 270, thereby permitting removal of the first latch 252 of the first connector 202 from the slot 260 of the second connector 204.

Each of the locking arms 270 is movable independently of the other locking arm 270. In this manner, the user must actuate both locking arms 270 to the second, unlocked position in order to remove the first connector 202 from the second connector 204. Actuation of one of the pair of locking arms 270 will not permit removal of the first latch 252 from the slot 260. In this manner, the locking and release mechanism 201 of the connection arrangement 200 has a redundant safety mechanism to prevent inadvertent disengagement of the first and second connectors 202, 204 due to accidental actuation of a single release tab 278.

Figure 6A:
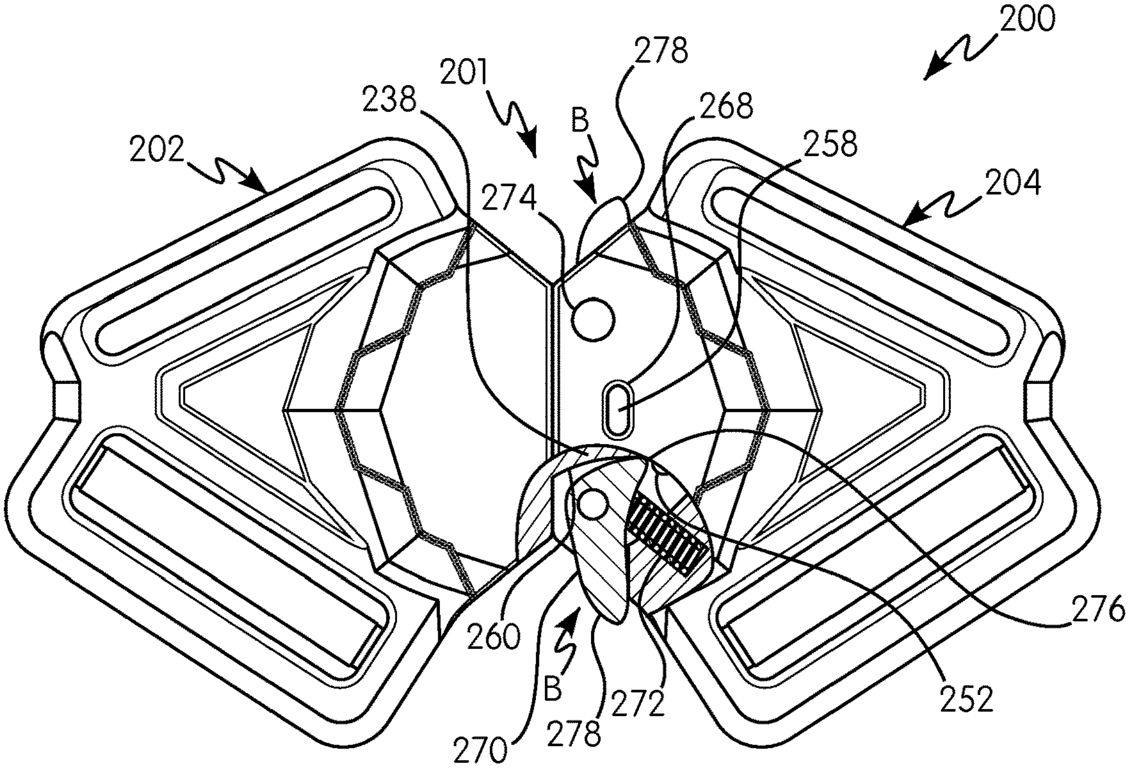
FIG. 6A is a front view of the harness connection arrangement showing a partial cross-sectional view of a locking and release mechanism in a first position.
Figure 6B:
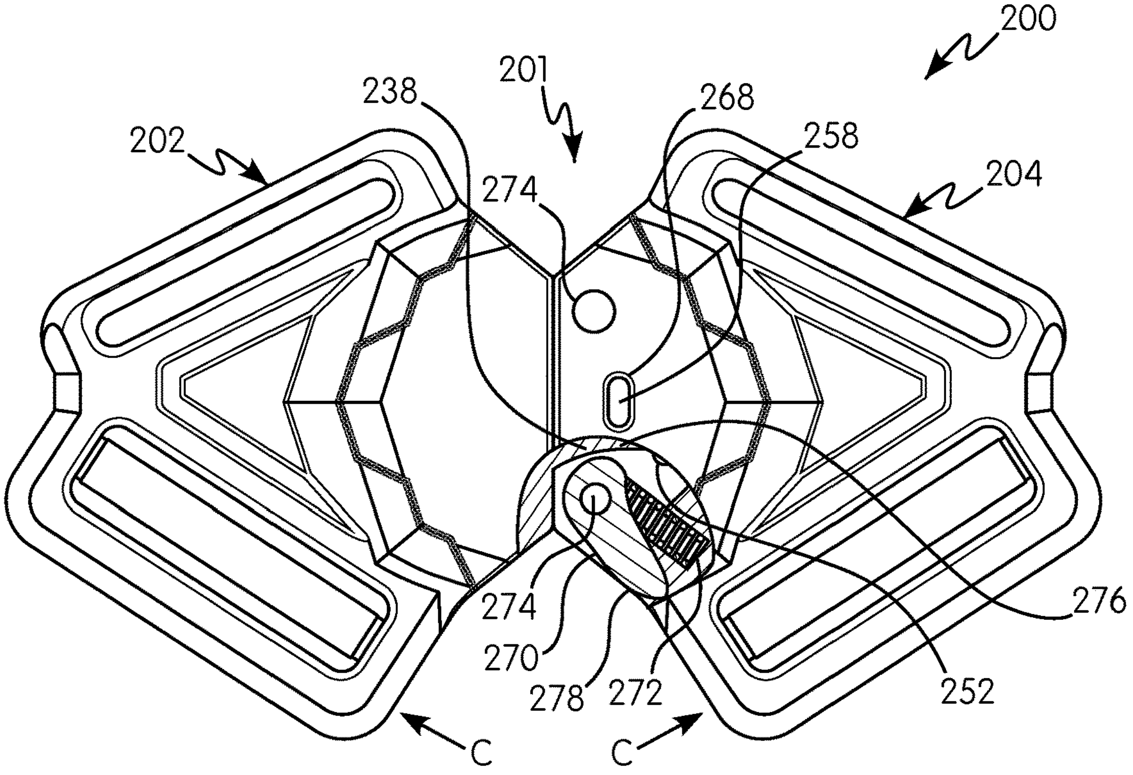
FIG. 6B is a front view of the harness connection arrangement showing a partial cross-sectional view of a locking and release mechanism in a second position.

Having described the structure of the connection arrangement 200, a method of disconnecting the first connector 202 from the second connector 204 and connecting the first connector 202 to the second connector 204 will now be described with reference to FIGS. 6A-6B. Referring initially to FIG. 6A, the connection arrangement 200 is shown in a locked configuration, where the first and second connectors 202, 204 are connected to each other. While straps of the harness 100 (shown in FIG. 1) are omitted from FIGS. 6A-6B for clarity, when the first and second connectors 202, 204 are in the locked configuration, at least two straps of the harness 100, such as the shoulder straps 110, are connected to each other to prevent removal of the harness 100 from the user's body.

To disconnect the first connector 202 from the second connector 204, the user first must actuate both release tabs 278 by pivoting each locking arm 270 about the pivot pin 274 in a direction of arrows B in FIG. 6A. As noted herein, movement of one of the pair of locking arms 270 will not permit removal of the first latch 252 from the slot 260. Such movement of the release tabs 278 separates the locking teeth 276 from the tab 238 of the first connector 202, such as shown in FIG. 6B. Once the release tabs 278 have been moved from a first position shown in FIG. 6A to a second position shown in FIG. 6B, the locking teeth 276 have been separated from the tab 238 of the first connector 202 to allow the first latch 252 of the tab 238 to be withdrawn from the slot 260 of the second connector 204 by moving the first connector 202 relative to the second connector 204 in a direction of arrows C in FIG. 6B. The restoring force of the biasing members 272 causes the locking arms 270 to revert back to the first position once the actuating force is removed from the release tabs 278.

The first and second connectors 202, 204 can be connected together by inserting the tab 238 of the first connector 202 into the slot 260 of the second connector 204, such as by positioning the first latch 252 of the tab 238 in a space defined between the locking teeth 276. The first and second connectors 202, 204 are then moved toward each other in a direction opposite to arrow C in FIG. 6B until the locking teeth 276 engage the first latch 252. The locking arms 270 can be moved from the first position (shown in FIG. 6A) to the second position (shown in FIG. 6B) either manually, such as by actuating both release tabs 278 by pivoting each locking arm 270 about the pivot pin 274 in a direction of arrows B in FIG. 6A, or automatically, such as due to physical contact between the first latch 252 with the inclined surfaces of the locking teeth 276. Movement of the locking arms 270 to the second position allows further insertion of the first latch 252 of the tab 238 in a space defined between the locking teeth 276 until the first latch 252 clears the locking teeth 276. The restoring force of the biasing members 272 causes the locking arms 270 to revert back to the first position once the actuating force is removed from the release tabs 278 and/or once the first latch 252 clears the locking teeth 276. The first connector 202 is thus locked with the second connector 204.

Although the disclosure has been described in detail for the purpose of illustration based on what are currently considered to be the most practical, preferred, and non-limiting embodiments or aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A connection arrangement for use with a wearable body harness, the connection arrangement comprising:
- a first connector comprising:
  - a first body;
  - an indicator;
  - a first fixed buckle configured to connect to a first portion of a first shoulder strap of the wearable body harness, the first fixed buckle being integral to the first body; and
  - a first adjustable buckle in contact with the first fixed buckle and configured to connect to a second portion of the first shoulder strap, a first frame of the first adjustable buckle being integral to the first body; and
- a second connector removably connectable to the first connector, the second connector comprising:
  - a second body;
  - an opening extending into an interior cavity of the second connector;
  - a second fixed buckle configured to connect to a first portion of a second shoulder strap of the wearable body harness, the second fixed buckle being integral to the second body; and
  - a second adjustable buckle in contact with the second fixed buckle and configured to connect to a second portion of the second shoulder strap, a second frame of the second adjustable buckle being integral to the second body,
- wherein:
  - each of the first adjustable buckle and the second adjustable buckle comprises an adjustment mechanism,
  - the adjustment mechanism is movable and configured for adjusting a length of the second portion of the first and second shoulder straps by selective frictional engagement with the second portion of the first and second shoulder straps;
  - the indicator is visible through the opening when the first connector is secured to the second connector.

2. The connection arrangement of claim 1, wherein the adjustment mechanism of the first connector comprises:
- the first frame having terminal ends connected to a body of the first connector with an opening defined between a central portion of the first frame and the body of the first connector, and
- an adjustment bar extending across the opening and movably engaged with the terminal ends of the first frame.

3. The connection arrangement of claim 2, wherein the adjustment bar has an elongated body movably engaged with the terminal ends of the first frame.

4. The connection arrangement of claim 3, wherein the elongated body is positioned within a slot of the first frame.

5. The connection arrangement of claim 1, wherein each of the first fixed buckle and the second fixed buckle comprises a bar spaced apart from a body of the first connector and the second connector by a gap.

6. The connection arrangement of claim 5, wherein the bar of each the first fixed buckle and the second fixed buckle is connected to the body of the first connector and the second connector by a pair of posts.

7. The connection arrangement of claim 1, wherein the first connector and the second connector are removably connectable to each other via a locking and release mechanism between a first, locked configuration, where the first connector and the second connector are connected and secured to each other, and a second, unlocked configuration, where the first connector and the second connector are disconnected from each other.

8. The connection arrangement of claim 7, wherein the first connector has a first portion of a locking and release mechanism, and wherein the second connector has a second portion of the locking and release mechanism, wherein the first portion of the locking and release mechanism comprises:

a tab having a first end connected to the body of the first connector and a second, free end protruding away from the body of the first connector, and a first latch at the second end of the tab and protruding laterally outward relative to at least one lateral side of the tab, and wherein the second portion of the locking and release mechanism comprises:

an upper plate and a lower plate defining a slot therebetween and configured for receiving at least a portion of the tab, and a pair of locking arms disposed within at least a portion of the slot and configured for interacting with the tab, the pair of locking arms movable between a first, locked position and a second, unlocked position to allow movement of at least a portion of the tab into and out of the slot.

9. The connection arrangement of claim 7, wherein each of the pair of locking arms has a locking tooth at a first end and a release tab at a second end with a pivot pin positioned between the locking tooth and the release tab such that each locking arm is pivotally movable about the pivot pin.

10. The connection arrangement of claim 7, wherein each of the pair of locking arms is biased to the first position by a biasing member.

11. The connection arrangement of claim 1, wherein a front side of the first body is substantially triangular shaped; and wherein a front side of the second body is substantially triangular shaped.

12. The connection arrangement of claim 1, wherein the first fixed buckle and the first frame of the first adjustable buckle each substantially form a side of the substantially triangular shaped first body.

13. A wearable body harness having a plurality of straps comprising:

a first shoulder strap and a second shoulder strap;

a first connector on the first shoulder strap; and a second connector on the second shoulder strap, the first shoulder strap and the second shoulder strap being removably connectable to each other with engagement of the first connector and the second connector, wherein the first connector comprises:

a first body;

an indicator;

a first fixed buckle configured to connect to a first portion of the first shoulder strap, the first fixed buckle being integral to the first body; and a first adjustable buckle in contact with the first fixed buckle and configured to connect to a second portion of the first shoulder strap, a first frame of the first adjustable buckle being integral to the first body, wherein the second connector comprises:

a second body;

an opening extending into an interior cavity of the second connector;

a second fixed buckle configured to connect to a first portion of the second shoulder strap, the second fixed buckle being integral to the second body; and a second adjustable buckle in contact with the second fixed buckle and configured to connect to a second portion of the second shoulder strap, a second frame of the second adjustable buckle being integral to the second body, and wherein:

each of the first adjustable buckle and the second adjustable buckle comprises an adjustment mechanism, the adjustment mechanism is movable and configured for adjusting a length of the second portion of the first and second shoulder straps by selective frictional engagement with the second portion of the first and second shoulder straps, the indicator is visible through the opening when the first connector is secured to the second connector.

14. The wearable body harness of claim 13, wherein the first shoulder strap and the second shoulder strap are arranged in an X-shaped configuration at a front portion of the harness.

15. The wearable body harness of claim 13, wherein the adjustment mechanism of the first connector comprises:

the first frame having terminal ends connected to a body of the first connector with an opening defined between a central portion of the first frame and the body of the first connector, and an adjustment bar extending across the opening and movably engaged with the terminal ends of the first frame.

16. The wearable body harness of claim 15, wherein the adjustment bar has an elongated body movably engaged with the terminal ends of the first frame.

17. The wearable body harness of claim 16, wherein the elongated body is positioned within a slot of the first frame.

18. The wearable body harness of claim 13, wherein each of the first fixed buckle and the second fixed buckle comprises a bar spaced apart from a body of the first connector and the second connector by a gap.

19. The wearable body harness of claim 17, wherein the bar of each the first fixed buckle and the second fixed buckle is connected to the body of the first connector and the second connector by a pair of posts.

20. The wearable body harness of claim 13, wherein the first connector and the second connector are removably connectable to each other via a locking and release mechanism between a first, locked configuration, where the first connector and the second connector are connected and secured to each other, and a second, unlocked configuration, where the first connector and the second connector are disconnected from each other.

21. The wearable body harness of claim 20, wherein the first connector has a first portion of a locking and release mechanism, and wherein the second connector has a second portion of the locking and release mechanism, wherein the first portion of the locking and release mechanism comprises:

a tab having a first end connected to the body of the first connector and a second, free end protruding away from the body of the first connector, and a first latch at the second end of the tab and protruding laterally outward relative to at least one lateral side of the tab, and wherein the second portion of the locking and release mechanism comprises:

an upper plate and a lower plate defining a slot therebetween and configured for receiving at least a portion of the tab, and a pair of locking arms disposed within at least a portion of the slot and configured for interacting with the tab, the pair of locking arms movable between a first, locked position and a second, unlocked position to allow movement of at least a portion of the tab into and out of the slot.

22. The wearable body harness of claim 20, wherein:

each of the pair of locking arms has a locking tooth at a first end and a release tab at a second end with a pivot pin positioned between the locking tooth and the release tab such that each locking arm is pivotally movable about the pivot pin, the indicator is on an upper side of the tab, and the opening is on the upper plate of the second connector.

* * * * *